US012299552B2

(12) United States Patent
Jordan et al.

(10) Patent No.: US 12,299,552 B2
(45) Date of Patent: May 13, 2025

(54) TRAINING TREE-BASED MACHINE-LEARNING MODELING ALGORITHMS FOR PREDICTING OUTPUTS AND GENERATING EXPLANATORY DATA

(71) Applicant: EQUIFAX INC., Atlanta, GA (US)

(72) Inventors: Lewis Jordan, Atlanta, GA (US); Matthew Turner, Cumming, GA (US); Finto Antony, Cumming, GA (US)

(73) Assignee: EQUIFAX INC., Atlanta, GA (US)

( * ) Notice: Subject to any disclaimer, the term of this patent is extended or adjusted under 35 U.S.C. 154(b) by 1096 days.

(21) Appl. No.: 17/182,053

(22) Filed: Feb. 22, 2021

(65) Prior Publication Data

US 2021/0174264 A1 Jun. 10, 2021

Related U.S. Application Data

(63) Continuation of application No. 16/341,046, filed as application No. PCT/US2017/059010 on Oct. 30, 2017, now Pat. No. 10,963,817.

(51) Int. Cl.
*G06N 20/20* (2019.01)
*G06N 5/01* (2023.01)
*G06N 5/04* (2023.01)

(52) U.S. Cl.
CPC .............. *G06N 20/20* (2019.01); *G06N 5/01* (2023.01); *G06N 5/04* (2013.01)

(58) Field of Classification Search
CPC ............ G06N 20/20; G06N 5/01; G06N 5/04; G06N 5/045; G06N 7/01
See application file for complete search history.

(56) References Cited

U.S. PATENT DOCUMENTS

| 6,154,736 A | 11/2000 | Chickering et al. |
| 10,963,817 B2 | 3/2021 | Jordan et al. |

(Continued)

FOREIGN PATENT DOCUMENTS

WO 2016106373 A1 6/2016

OTHER PUBLICATIONS

Feelders A. Monotone relabeling in ordinal classification. In2010 IEEE International Conference on Data Mining Dec. 13, 2010 (pp. 803-808). IEEE. (Year: 2010).*

(Continued)

*Primary Examiner* — Michael J Huntley
*Assistant Examiner* — Sehwan Kim
(74) *Attorney, Agent, or Firm* — Kilpatrick Townsend & Stockton LLP

(57) ABSTRACT

Certain aspects involve training tree-based machine-learning models for computing predicted responses and generating explanatory data for the models. For example, independent variables having relationships with a response variable are identified. Each independent variable corresponds to an action or observation for an entity. The response variable has outcome values associated with the entity. Splitting rules are used to generate the tree-based model, which includes decision trees for determining relationships between independent variables and a predicted response associated with the response variable. The tree-based model is iteratively adjusted to enforce monotonicity with respect to representative response values of the terminal nodes. For instance, one or more decision trees are adjusted such that one or more representative response values are modified and a monotonic relationship exists between each independent variable and the response variable. The adjusted model is used to output explanatory data indicating relationships between independent variable changes and response variable changes.

17 Claims, 12 Drawing Sheets

(56) References Cited

U.S. PATENT DOCUMENTS

| | | | |
|---|---|---|---|
| 2007/0260563 | A1 | 11/2007 | Fan et al. |
| 2015/0379426 | A1 | 12/2015 | Steele et al. |
| 2016/0019587 | A1 | 1/2016 | Hueter et al. |
| 2016/0364511 | A1* | 12/2016 | Kirshner ................ G06N 20/20 |
| 2017/0117841 | A1 | 4/2017 | Watanabe et al. |

OTHER PUBLICATIONS

Pei, Shenglei, Qinghua Hu, and Chao Chen. "Multivariate decision trees with monotonicity constraints." Knowledge-Based Systems 112 (2016): 14-25. (Year: 2016).*
Ben-Gal, Irad, and Chavazelet Trister. "Parallel construction of decision trees with consistently non-increasing expected number of tests." Applied Stochastic Models in Business and Industry 31.1 (2015): 64-78. (Year: 2015).*
Daniels, Hennie AM, and Marina V. Velikova. "Derivation of monotone decision models from noisy data." IEEE Transactions on Systems, Man, and Cybernetics, Part C (Applications and Reviews) 36.5 (2006): 705-710. (Year: 2006).*
Amvrosiadis, et al., "Getting Back up: Understanding How Enterprise Data Backups Fail", 2016 USENIX Annual Technical Conference, Available Online at: https://www.usenix.org/system/files/conference/atc16/atc16_paper-amvrosiadis.pdf, Jun. 22, 2016, pp. 479-492.
European Patent Application No. 17930823.4, "Extended European Search Report", Jul. 23, 2021, 13 pages.
Gonzalez, et al., "Managing Monotonicity in Classification by a Pruned AdaBoost", International Conference on Hybrid Artificial Intelligence Systems, Apr. 14, 2016, pp. 512-523.
Gonzalez, et al., "Monotonic Random Forest with an Ensemble Pruning Mechanism based on the Degree of Monotonicity", New Generation Computing, vol. 33, No. 4, Oct. 31, 2015, pp. 367-388.
SG11202003694q, "Witten Opinion", Mar. 25, 2021, 7 pages.
Sousa, et al., "Ensemble of Decision Trees with Global Constraints for Ordinal Classification", Intelligent Systems Design and App Lications (ISDA), 2011 11th International Conference on, IEEE, Nov. 22, 2011, 6 pages.
AU2017437537, "First Examination Report", May 3, 2023, 4 pages.
Canadian Application No. CA3,080,050, Office Action, Mailed on Dec. 6, 2023, 6 pages.
Australian Application No. AU2017437537, "Notice of Acceptance", Mailed on Oct. 25, 2023, 3 pages.
U.S. Appl. No. 16/341,046, "Notice of Allowance", Nov. 23, 2020, 18 pages.
Breiman, "Random Forest Models", Machine Learning, vol. 45, No. 1, 2001, 28 pages.
Chipman, et al., "High Dimensional Nonparametric Monotone Function Estimation Using BART", Manuscript Submitted for Publication, 2016, 48 pages.
Elith, et al., "A Working Guide to Boosted Regression Trees", Journal of Animal Ecology, vol. 77 No. 4, Apr. 8, 2008, pp. 802-813.
Friedman, et al., "Additive Logistic Regression: A Statistical View of Boosting", The Annals of Statistics, vol. 28, No. 2, 2000, pp. 337-407.
Hastie, et al., "The Elements of Statistical Learning: Data Mining, Inference, and Prediction", Springer, Second Edition, 2008, 764 pages.
McCulloch, "Monotonically Constrained Bayesian Additive Regression Trees", Available Online at: http://www.rob-mcculloch.org/some_papers_and_talks/talks/bc_st-louis.pdf, May 3, 2013, 42 pages.
Nelder, et al., "Generalized Linear Models", Journal of the Royal Statistical Society. A, vol. 135, 1972, pp. 370-384.
PCT/US2017/059010, "International Preliminary Report on Patentability", May 14, 2020, 12 pages.
PCT/US2017/059010, "International Search Report and Written Opinion", Jul. 26, 2018, 15 pages.
Pei, et al., "Multivariate Decision Trees With Monotonicity Constraints", Knowledge-Based Systems, vol. 112, Nov. 15, 2016, pp. 14-25.
Taillandier, "Diagnosis in Systems Based on an Informed Tree Search Strategy: Application to Cartographic Generalisation", Proceedings of the 5th International Conference on Soft Computing as Transdisciplinary Science and Technology., Oct. 2008, pp. 589-594.
Therneau, "A Short Introduction to Recursive Partitioning", Orion 21, Jun. 1983, 14 pages.
Wolfinger, et al., "Genearlized Linear Mixed Models: A Pseudo-Likelihood Approach", Journal of Statistical Computation and Simulation, vol. 48, 1993, pp. 223-243.
European Application No. EP17930823.4, Office Action, Mailed on Feb. 23, 2024, 6 pages.
European Application No. EP17930823.4, "Summons to Attend Oral Proceedings", Feb. 28, 2025, 13 pages.

* cited by examiner

TRAINING TREE-BASED MACHINE-LEARNING MODELING ALGORITHMS FOR PREDICTING OUTPUTS AND GENERATING EXPLANATORY DATA

CROSS-REFERENCES TO RELATED APPLICATIONS

This application is a continuation application of application Ser. No. 16/341,046, filed Apr. 10, 2019, entitled TRAINING TREE-BASED MACHINE-LEARNING MODELING ALGORITHMS FOR PREDICTING OUTPUTS AND GENERATING EXPLANATORY DATA, which is the National Stage of International Application No. PCT/US2017/059010, filed Oct. 30, 2017. The entire disclosures of all these applications (including all attached documents) are incorporated by reference in their entireties for all purposes.

TECHNICAL FIELD

The present disclosure relates generally to machine learning. More specifically, but not by way of limitation, this disclosure relates to machine learning using tree-based algorithms for emulating intelligence, where the tree-based algorithms are trained for computing predicted outputs (e.g., a risk indicator or other predicted value of a response variable of interest) and generating explanatory data regarding the impact of corresponding independent variables used in the tree-based algorithms.

BACKGROUND

Automated modeling systems can implement tree-based machine-learning modeling algorithms that are fit using a set of training data. This training data, which can be generated by or otherwise indicate certain electronic transactions or circumstances, is analyzed by one or more computing devices of an automated modeling system. The training data includes data samples having values of a certain output, which corresponds to a response variable of interest in the model developed by the automated modeling system, and data samples having values of various predictors, which correspond to independent variables in the model developed by the automated modeling system. The automated modeling system can be used to analyze and learn certain features or patterns from the training data and make predictions from "new" data describing circumstances similar to the training data. For example, the automated modeling system uses, as training data, sample data that contains at least one output and relevant predictors. The automated modeling system uses this training data to learn the process that resulted in the generation of response variables (i.e., the output or other response variable) involving transactions or other circumstances (i.e., the predictors or other independent variables). The learned process can be applied to other data samples similar to the training data, thereby to predicting the response variable in the presence of predictors or independent variables.

SUMMARY

Various aspects of the present disclosure involve training tree-based machine-learning models used in automated modeling algorithms. The tree-based machine-learning models can compute a predicted response, e.g. probability of an event or expectation of a response, and generate explanatory data regarding how the independent variables used in the model affect the predicted response. For example, independent variables having relationships with a response variable are identified. Each independent variable corresponds to an action performed by an entity or an observation of the entity. The response variable has a set of outcome values associated with the entity. Splitting rules are used to generate the tree-based machine-learning model. The tree-based machine-learning model includes decision trees for determining a relationship between each independent variable and a predicted response associated with the response variable. The predicted response indicates a predicted behavior associated with the entity. The tree-based machine-learning model is iteratively adjusted to enforce monotonicity with respect to the representative response values of the terminal nodes. For instance, one or more decision trees are adjusted such that one or more representative response values are modified and a monotonic relationship exists between each independent variable and the response variable. The adjusted tree-based machine-learning model is used to output explanatory data indicating relationships between changes in the response variable and changes in one or more of the independent variables.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

BRIEF DESCRIPTION OF THE DRAWINGS

Features, aspects, and advantages of the present disclosure are better understood when the following Detailed Description is read with reference to the drawings.

DETAILED DESCRIPTION

Figure 1:
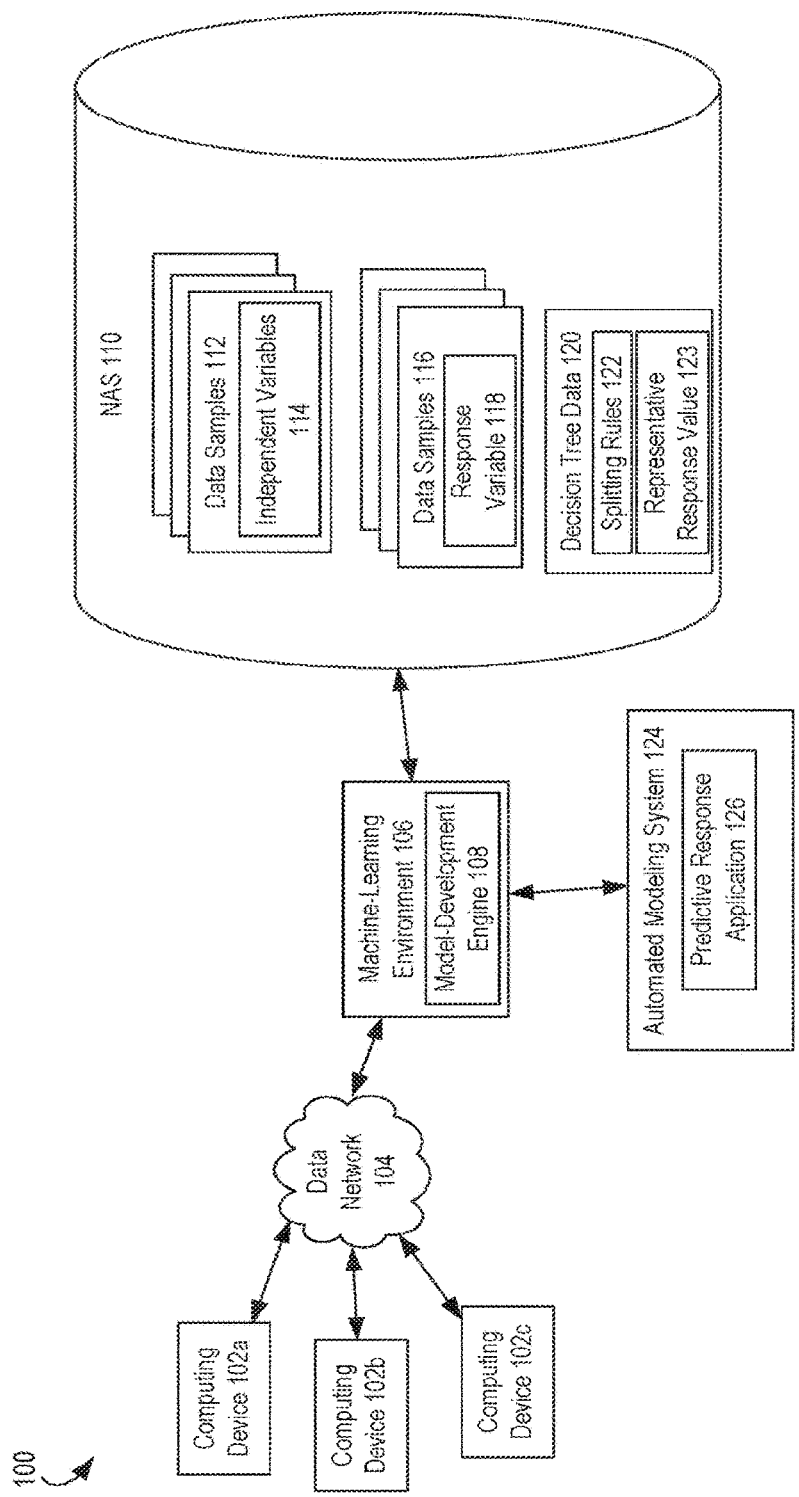
FIG. 1 is a block diagram depicting an example of an operating environment in which a model-development engine trains tree-based machine-learning models, according to certain aspects of the present disclosure.

Certain aspects and features of the present disclosure involve training a tree-based machine-learning model used by automated modeling algorithms, where a tree-based machine-learning model can include one or more models that use decision trees. Examples of tree-based machine-learning models include (but are not limited to) gradient boosted machine models and random forest models. An automated modeling algorithm can use the tree-based machine-learning model to perform a variety of functions including, for example, utilizing various independent variables and generating a predicted response associated with the independent variables. Training the tree-based machine-learning model can involve enforcing monotonicity with respect to one or more decision trees in the tree-based machine-learning model. Monotonicity can include, for example, similar trends between independent variables and the response variable (e.g., a response variable increasing if an independent variable increases, or vice versa). In some aspects, enforcing monotonicity can allow the tree-based machine-learning model to be used for computing a predicted response as well as generating explanatory data, such as reason codes that indicate how different independent variables impact the computed predicted response.

A model-development tool can train a tree-based machine-learning model by iteratively modifying splitting rules used to generate one or more decision trees in the model. For example, the model-development tool can determine whether values in the terminal nodes of a decision tree have a monotonic relationship with respect to one or more independent variables in the decision tree. In one example of a monotonic relationship, the predicted response increases as the value of an independent variable increases (or vice versa). If the model-development tool detects an absence of a required monotonic relationship, the model-development tool can modify a splitting rule used to generate the decision tree. For example, a splitting rule may require that data samples with independent variable values below a certain threshold value are placed into a first partition (i.e., a left-hand side of a split) and that data samples with independent variable values above the threshold value are placed into a second partition (i.e., a right-hand side of a split). This splitting rule can be modified by changing the threshold value used for partitioning the data samples.

A model-development tool can also train an unconstrained tree-based machine-learning model by smoothing over the representative response values. For example, the model-development tool can determine whether values in the terminal nodes of a decision tree are monotonic. If the model-development tool detects an absence of a required monotonic relationship, the model-development tool can smooth over the representative response values of the decision tree, thus enforcing monotonicity. For example, a decision tree may require that the predicted response increases if the decision tree is read from left to right. If this restriction is violated, the predicted responses can be smoothed (i.e., altered) to enforce monotonicity.

In some aspects, training the tree-based machine-learning model by enforcing monotonicity constraints enhances computing devices that implement artificial intelligence. The artificial intelligence can allow the same tree-based machine-learning model to be used for determining a predicted response and for generating explanatory data for the independent variables. For example, a tree-based machine-learning model can be used for determining a level of risk associated with an entity, such as an individual or business, based on independent variables predictive of risk that is associated with an entity. Because monotonicity has been enforced with respect to the model, the same tree-based machine-learning model can be used to compute explanatory data describing the amount of impact that each independent variable has on the value of the predicted response. An example of this explanatory data is a reason code indicating an effect or an amount of impact that a given independent variable has on the value of the predicted response. Using these tree-based machine-learning models for computing both a predicted response and explanatory data can allow computing systems to allocate process and storage resources more efficiently, as compared to existing computing systems that require separate models for predicting a response and generating explanatory data.

In some aspects, tree-based machine-learning models can provide performance improvements as compared to existing models that quantify a response variable associated with individuals or other entities. For example, certain risk management models can be generated using logistic regression models, where decision rules are used to determine reason action code assignments that indicate the rationale for one or more types of information in a risk assessment.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example

Referring now to the drawings, FIG. 1 is a block diagram depicting an example of an operating environment 100 in which a machine-learning environment 106 trains tree-based machine-learning models. FIG. 1 depicts examples of hardware components of an operating environment 100, according to some aspects. The operating environment 100 is a specialized computing system that may be used for processing data using a large number of computer processing cycles. The numbers of devices depicted in FIG. 1 are provided for illustrative purposes. Different numbers of devices may be used. For example, while each device, server, and system in FIG. 1 is shown as a single device, multiple devices may instead be used.

The operating environment 100 may include a machine-learning environment 106. The machine-learning environment 106 may be a specialized computer or other machine that processes the data received within the operating environment 100. The machine-learning environment 106 may include one or more other systems. For example, the machine-learning environment 106 may include a database system for accessing the network-attached data stores 110, a communications grid, or both. A communications grid may be a grid-based computing system for processing large amounts of data.

The operating environment 100 may also include one or more network-attached data stores 110. The network-attached data stores 110 can include memory devices for storing data samples 112, 116 and decision tree data 120 to be processed by the machine-learning environment 106. In some aspects, the network-attached data stores 110 can also store any intermediate or final data generated by one or more components of the operating environment 100. The data samples 112, 116 can be provided by one or more computing devices 102a-c, generated by computing devices 102a-c, or otherwise received by the operating environment 100 via a data network 104. The decision tree data 120 can be generated by the model-development engine 108 using the data samples 112, 116.

The data samples 112 can have values for various independent variables 114. The data samples 116 can have values for one or more response variables 118. For example, a large number of observations can be generated by electronic transactions, where a given observation includes one or more independent variables (or data from which an independent variable can be computed or otherwise derived). A given observation can also include data for a response variable or data from which a response variable value can be derived. Examples of independent variables can include data associated with an entity, where the data describes behavioral or physical traits of the entity, observations with respect to the entity, prior actions or transactions involving the entity (e.g., information that can be obtained from credit files or records, financial records, consumer records, or other data about the activities or characteristics of the entity), or any other traits that may be used to predict the response associated with the entity. In some aspects, independent variables can be obtained from credit files, financial records, consumer records, etc. An automated modeling algorithm can use the data samples 112, 116 to learn relationships between the independent variables 114 and one or more response variables 118.

Network-attached data stores 110 may also store a variety of different types of data organized in a variety of different ways and from a variety of different sources. For example, network-attached data stores 110 may include storage other than primary storage located within machine-learning environment 106 that is directly accessible by processors located therein. Network-attached data stores 110 may include secondary, tertiary, or auxiliary storage, such as large hard drives, servers, virtual memory, among other types. Storage devices may include portable or non-portable storage devices, optical storage devices, and various other mediums capable of storing or containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

The operating environment 100 can also include one or more computing devices 102a-c. The computing devices 102a-c may include client devices that can communicate with the machine-learning environment 106. For example, the computing devices 102a-c may send data to the machine-learning environment 106 to be processed, may send signals to the machine-learning environment 106 to control different aspects of the computing environment or the data it is processing. The computing devices 102a-c may interact with the machine-learning environment 106 via one or more networks 104.

The computing devices 102a-c may include network computers, sensors, databases, or other devices that may transmit or otherwise provide data to the machine-learning environment 106. For example, the computing devices 102a-c may include local area network devices, such as routers, hubs, switches, or other computer networking devices.

Each communication within the operating environment 100 may occur over one or more networks 104. Networks 104 may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or combination of wireless interfaces. A wired network may include a wired interface. The wired or wireless networks may be implemented using routers, access points, bridges, gateways, or the like, to connect devices in the network 104. The networks 104 can be incorporated entirely within (or can include) an intranet, an extranet, or a combination thereof. In one example, communications between two or more systems or devices can be achieved by a secure communications protocol, such as secure sockets layer ("SSL") or transport layer security ("TLS"). In addition, data or transactional details may be encrypted.

The machine-learning environment 106 can include one or more processing devices that execute program code stored on a non-transitory computer-readable medium. The program code can include a model-development engine 108.

The model-development engine 108 can generate decision tree data 120 using one or more splitting rules 122 and store representative response values 123. A splitting rule 122 can be used to divide a subset of the data samples 116 (i.e., response variable values) based on the corresponding data samples 112 (i.e., independent variable values). For instance, a splitting rule 122 may divide response variable values into two partitions based on whether the corresponding independent variable values are greater than or less than a threshold independent variable value. The model-development engine 108 can iteratively update the splitting rules 122 to enforce monotonic relationships in a tree-based machine-learning model, as described in detail herein. A representative response value 123 can be, for example, a value associated with a terminal node in a decision tree. The representative response value 123 can be computed from data samples in a partition corresponding to the terminal node. For example, a representative response value 123 may be a mean of response variable values in a subset of the data samples 116 within a partition corresponding to the terminal node (i.e., a node without child nodes).

The operating environment 100 may also include one or more automated modeling systems 124. The machine-learning environment 106 may route select communications or data to the automated modeling systems 124 or one or more servers within the automated modeling systems 124. Automated modeling systems 124 can be configured to provide information in a predetermined manner. For example, automated modeling systems 124 may access data to transmit in response to a communication. Different automated modeling systems 124 may be separately housed from each other device within the operating environment 100, such as machine-learning environment 106, or may be part of a device or system. Automated modeling systems 124 may host a variety of different types of data processing as part of the operating environment 100. Automated modeling systems 124 may receive a variety of different data from the computing devices 102a-c, from the machine-learning environment 106, from a cloud network, or from other sources.

Examples of automated modeling systems 124 include a mainframe computer, a grid computing system, or other computing system that executes an automated modeling algorithm, which uses tree-based machine-learning models with learned relationships between independent variables and the response variable. In some aspects, the automated modeling system 124 can execute a predictive response application 126, which can utilize a tree-based machine-learning model optimized, trained, or otherwise developed using the model-development engine 108. In additional or alternative aspects, the automated modeling system 124 can execute one or more other applications that generate a predicted response, which describe or otherwise indicate a predicted behavior associated with an entity. These predicted outputs can be generated using a tree-based machine-learning model that has been trained using the model-development engine 108.

Training a tree-based machine-learning model for use by the automated modeling system 124 can involve ensuring that the tree-based machine-learning model provides a predicted response, as well as an explanatory capability. Certain predictive response applications 126 require using models having an explanatory capability. An explanatory capability can involve generating explanatory data such as adverse action codes (or other reason codes) associated with independent variables that are included in the model. This explanatory data can indicate an effect or an amount of impact that a given independent variable has on a predicted response generated using an automated modeling algorithm.

Figure 2:
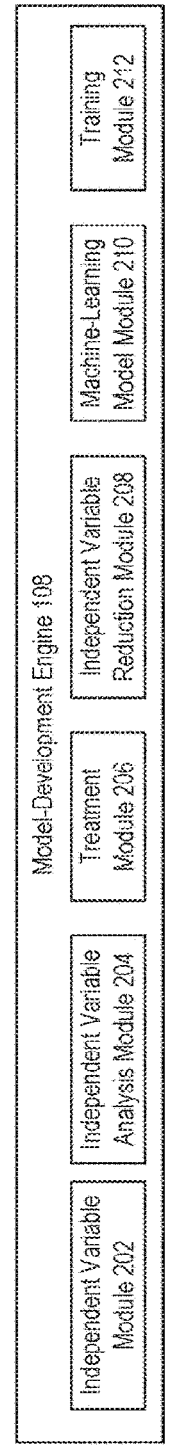
FIG. 2 is a block diagram depicting an example of the model-development engine of FIG. 1, according to certain aspects of the present disclosure.

The model-development engine 108 can include one or more modules for generating and training the tree-based machine-learning model. For example, FIG. 2 is a block diagram depicting an example of the model-development engine 108 of FIG. 1. The model-development engine 108 depicted in FIG. 2 can include various modules 202, 204, 206, 208, 210, 212 for generating and training a tree-based machine-learning model, which can be used for generating a predicted response providing predictive information. Each of the modules 202, 204, 206, 208, 210, 212 can include one or more instructions stored on a computer-readable medium and executable by processors of one or more computing systems, such as the machine-learning environment 106 or the automated modeling system 124. Executing the instructions causes the model-development engine 108 to generate a tree-based machine-learning model and train the model. The trained model can generate a predicted response, and can provide explanatory data regarding the generation of the predicted response (e.g., the impacts of certain independent variables on the generation of a predicted response).

The model-development engine 108 can use the independent variable module 202 for obtaining or receiving data samples 112 having values of multiple independent variables 114. In some aspects, the independent variable module 202 can include instructions for causing the model-development engine 108 to obtain or receive the data samples 112 from a suitable data structure, such a database stored in the network-attached data stores 110 of FIG. 1. The independent variable module 202 can use any independent variables or other data suitable for assessing the predicted response associated with an entity. Examples of independent variables can include data associated with an entity that describes observations with respect to the entity, prior actions or transactions involving the entity (e.g., information that can be obtained from credit files or records, financial records, consumer records, or other data about the activities or characteristics of the entity), behavioral or physical traits of the entity, or any other traits that may be used to predict a response associated with the entity. In some aspects, independent variables 114 can be obtained from credit files, financial records, consumer records, etc.

In some cases, the model-development engine 108 can include an independent variable analysis module 204 for analyzing various independent variables. The independent variable analysis module 204 can include instructions for causing the model-development engine 108 to perform various operations on the independent variables for analyzing the independent variables.

For example, the independent variable analysis module 204 can perform an exploratory data analysis, in which the independent variable analysis module 204 determines which independent variables are useful in explaining variability in the response variable of interest. Analysis module 204 can also be used to determine which independent variables are useful in explaining the variability in the response variable. An example of this would be utilizing machine learning algorithms that provided for measures of an independent variables importance. Importance can be measured as how much an independent variable contributes to explaining the variability in the response variable. The independent variable analysis module 204 can also perform exploratory data analysis to identify trends associated with independent variables and the response variable of interest.

The model-development engine 108 can also include a treatment module 206 for enforcing a monotonic relationship between an independent variable and the response variable. In some aspects, the treatment module 206 can execute one or more algorithms that apply a variable treatment, which can force the relationship between the independent variable and the response variable to adhere to know business rules. Examples of functions used for applying a variable treatment include (but are not limited to) binning, capping or flooring, imputation, substitution, recoding variable values, etc.

The model-development engine 108 can also include an independent variable reduction module 208 for identifying or determining a set of independent variables that are redundant, or do not contribute to explaining the variability in the response variable, or do not adhere to known business rules. The independent variable reduction module 208 can execute one or more algorithms that apply one or more preliminary variable reduction techniques. Preliminary variable reduction techniques can include rejecting or removing independent variables that do not explain variability in the response variable, or do not adhere to known business rules.

In some aspects, the model-development engine 108 can include a machine-learning model module 210 for generating a tree-based machine-learning model. The machine-learning model module 210 can include instructions for causing the model-development engine 108 to execute one or more algorithms to generate the tree-based machine-learning model.

A tree-based machine-learning model can be generated by the machine-learning module 210. Examples of a tree-based machine-learning model include, but are not limited to, random forest models and gradient boosted machines. In certain tree-based machine-learning models, decision trees can partition the response variable into disjoint homogeneous regions within the independent variable space. This results in a step or piecewise approximation of the underlying function in the independent variable space (assuming continuous independent variables). Gradient boosted machine and random forest models are ensembles of these decision trees.

In some aspects, the machine-learning model module 210 includes instructions for causing the model-development engine 108 to generate a tree-based machine-learning model using a set of independent variables. For example, the model-development engine 108 can generate the tree-based machine-learning model such that the tree-based machine-learning model enforces a monotonic relationship between the response variable and the set of independent variables identified by the independent variable reduction module 208.

The model-development engine 108 can generate any type of tree-based machine-learning model for computing a predicted response. In some aspects, the model-development engine can generate a tree-based machine-learning model based on one or more criteria or rules obtained from industry standards. In other aspects, the model-development engine can generate a tree-based machine-learning model without regard to criteria or rules obtained from industry standards.

In some aspects, the model-development engine 108 can generate a tree-based machine-learning model and use the tree-based machine-learning model for computing a predictive response value, such as a credit score, based on independent variables. The model-development engine 108 can train the tree-based machine-learning model such that the predicted response of the model can be explained. For instance, the model-development engine 108 can include a training module 212 for training the tree-based machine-learning model generated using the model-development engine 108. Training the tree-based machine-learning model can allow the same tree-based machine-learning model to identify both the predicted response and the impact of an independent variable on the predicted response. Examples of training the tree-based machine-learning model are described herein with respect to FIG. 3.

In some aspects, a training module 212 can adjust the tree-based machine-learning model. The training module 212 can include instructions to the model-development engine 108 to determine whether a relationship between a given independent variable and the predicted response value is monotonic. A monotonic relationship exists between an independent variable and the predicted response value if a value of the predicted response increases as a value of the independent variable increases or if the value of the predicted response value decreases as the value of the independent variable decreases. For instance, if an exploratory data analysis indicates that a positive relationship exists between the response variable and an independent variable, and a tree-based machine-learning model shows a negative relationship between the response variable and the independent variable, the tree-based machine-learning model can be modified. The architecture of the tree-based machine-learning model can be changed by modifying the splitting rules used to generate decision trees in the tree-based machine-learning model, by eliminating one or more of the independent variables from the tree-based machine-learning model, or some combination thereof.

Training the tree-based machine-learning model in this manner can allow the model-development engine 108, as well as predictive response application 126 or other automated modeling algorithms, to use the model to determine the predicted response values using independent variables and to determine associated explanatory data (e.g., adverse action or reason codes). The model-development engine 108 can output one or more of the predictive response values and the explanatory data associated with one or more of the independent variables. In some applications used to generate credit decisions, the model-development engine 108 can use a tree-based machine-learning model to provide recommendations to a consumer based on adverse action codes or other explanatory data. The recommendations may indicate one or more actions that the consumer can take to improve the predictive response value (e.g., improve a credit score).

Figure 3:
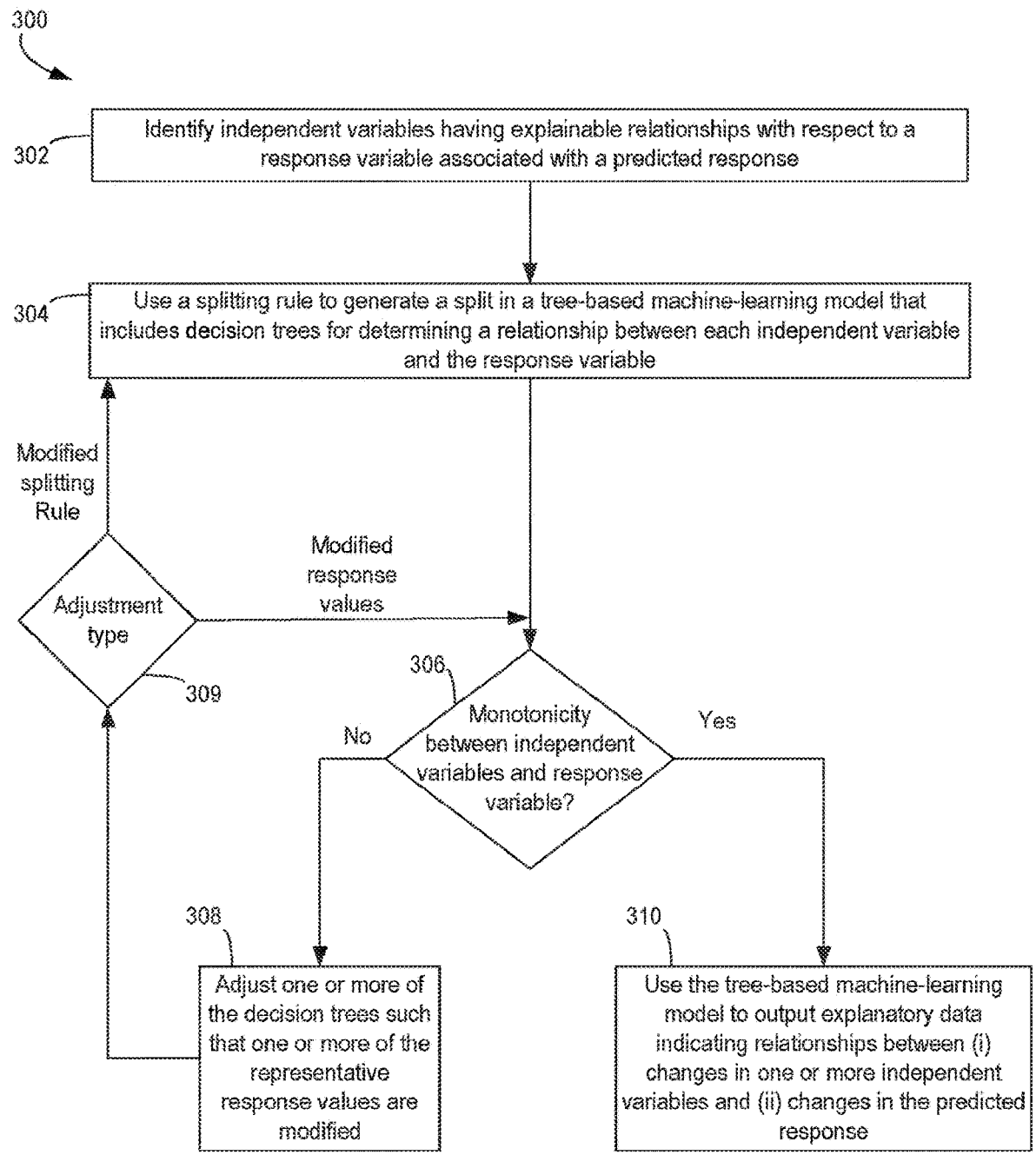
FIG. 3 is a flow chart depicting an example of a process for training a tree-based machine-learning model for computing predicted outputs, according to certain aspects of the present disclosure.

FIG. 3 is a flow chart depicting an example of a process 300 for training a tree-based machine-learning model. For illustrative purposes, the process 300 is described with reference to various examples described herein. But other implementations are possible.

The process 300 can involve identifying independent variables having an explainable relationship with respect to a response variable associated with a predicted response, as depicted in block 302. For example, the machine-learning model module 210 can identify a set of independent variables to be used in a tree-based machine learning model based on, for example, one or more user inputs received by the machine-learning environment. Each of the independent variables can have a positive relationship with respect to a response variable, in which the response variable's value increases with an increase in the independent variable's value, or a negative relationship with respect to a response variable, in which the response variable's value decreases with a decrease in the independent variable's value. In a simplified example, an independent variable can be a number of financial delinquencies, a response variable can be a certain outcome (e.g., a good/bad odds ratio) having different outcome values (e.g., the values of the good/bad odds ratio), and a predicted response can be a credit score or other risk indicator. But other types of independent variables, response variables, and predicted responses may be used.

A set of predicted response values can include or otherwise indicate degrees to which the entity has satisfied a condition. A given relationship is explainable if, for example, the relationship has been derived or otherwise identified using one or more operations described herein with respect to FIG. 4. For example, an explainable relationship can involve a trend that is monotonic, does not violate any regulatory constraint, and satisfies relevant business rules by, for example, treating similarly situated entities in a similar manner. In some aspects, each independent variable can correspond to actions performed by one or more entities, observations with respect to one or more entities, or some combination thereof. One or more of the independent variable module 202, the independent variable analysis module 204, the treatment module 206, and the independent variable reduction module 208 can be executed by one or more suitable processing devices to implement block 302. Executing one or more of these modules can provide a set of independent variables having pre-determined relationships with respect to the predicted response. The model-development engine 108 can identify and access the set of independent variables for use in generating tree-based machine-learning models (e.g., a gradient boosted machine, a random forest model, etc.).

The process 300 can also involve using one or more splitting rules to generate a split in a tree-based machine-learning model that includes decision trees for determining a relationship between each independent variable and the response variable, as depicted in block 304. For example, the machine-learning model module 210 can be executed by one or more processing devices. Executing the machine-learning model module 210 can generate a gradient boosted machine, a random forest model, or another tree-based machine-learning model.

Generating the tree-based machine-learning models can involve performing a partition in a decision tree. In a simplified example, $\{y_i, x_i\}_1^n$ can be a data sample in which $y_i$ is the response variable of interest and $x=\{x_1, \ldots, x_p\}$ is a p-dimensional vector of independent variables. In this example, $X=\{x_i\}_1^n$ is the n×p space containing all x vectors. The data samples can be partitioned based on the independent variable values. For instance, a splitting rule may specify that partitions are formed based on whether an element of X is greater than or less than some threshold, $\theta$. The machine-learning module 210 applies the splitting rule by assigning data samples in which the independent variable value is less than $\theta$ into a first group and assigning data samples in which the independent variable value is greater than $\theta$ into a second group. The machine-learning module 210 also computes a representative response value for each group by, for example, computing a mean of the response variable values in the first group and a mean of the response variable values in the second group. Examples of generating a decision tree are described herein with respect to FIGS. 5-9.

The process 300 can also involve determining whether a monotonic relationship exists between each independent variable and the response variable based on representative response values for nodes of one or more of the decision trees, as depicted in block 306. For example, the training module 212 can be executed by one or more suitable processing devices. Executing the training module 212 can cause the machine-learning environment 106 to determine whether the relationship exists between independent variable values and predicted response values. Detailed examples of monotonicity with respect to decision trees are described herein with respect to FIGS. 8-13.

In some aspects, the training module 212 can evaluate the relationships after each split is performed, with at least some evaluations being performed prior to a decision tree being completed. Examples of evaluating the monotonicity after each split is performed are described herein with respect to FIGS. 10 and 11. In some aspects, the training module 212 can evaluate the relationship after a tree has been completed. Examples of evaluating the monotonicity after a decision tree has been completed are described herein with respect to FIGS. 12 and 13.

If the monotonic relationship does not exist with respect to one or more independent variables and the predicted output, the process 300 can also involve adjusting one or more of the decision trees such that one or more of the representative response values are modified, as depicted in block 308. One or more of the machine-learning model module 210 and the training module 212 can be executed by one or more suitable processing devices to implement block 308.

In some aspects, executing one or more of these modules can modify one or more splitting rules used to generate the tree-based machine-learning model. For example, block 309 indicates that an adjustment to a tree-based machine-learning model can involve modifying a splitting rule, which can result in at least some representative response values being modified. Examples of modifying the splitting rules are described herein with respect to FIGS. 10 and 11. In these aspects, the process 300 can return to block 304 and perform another iteration using the modified splitting rules.

In additional or alternative aspects, executing one or more of these modules can cause targeted changes to specific representative response values without modifying splitting rules (e.g., changing a set of adjacent representative response values to their mean or otherwise smoothing over these values). For example, block 309 indicates that an adjustment to a tree-based machine-learning model can involve these targeted changes to specific representative response values. Examples of making targeted changes to specific representative response values are described herein with respect to FIGS. 11 and 12. In these aspects, the process 300 can return to block 306 and verify that the adjustment has resulted in the desired monotonicity.

If the monotonic relationship exists between each independent variable and the predictive output, the process 300 can proceed to block 310. At block 310, the process 300 can involve outputting, using the adjusted tree-based machine-learning model, explanatory data indicating relationships between changes in the predicted response and changes in at least some of the independent variables evaluated at block 306. For example, one or more of the model-development engine 108 or the predictive response application 126 can be executed by one or more suitable processing devices to implement block 310. Executing the model-development engine 108 or the predictive response application 126 can involve using the tree-based machine-learning model to generate explanatory data that describes, for example, relationships between certain independent variables and a predicted response (e.g., a risk indicator) generated using the tree-based machine-learning model.

FIG. 3 presents a simplified example for illustrative purposes. In some aspects, the tree-based machine-learning model can be built in a recursive, binary process in which the tree-based machine-learning model grows until certain criteria are satisfied (e.g., number of observations in a terminal node, etc.).

Selection of Independent Variables for Model Training

In some aspects, the model-development engine 108 can identify the independent variables used in the process 300 by, for example, identifying a set of candidate independent variables and determining relationships between the candidate independent variable and the response variable.

Figure 4:
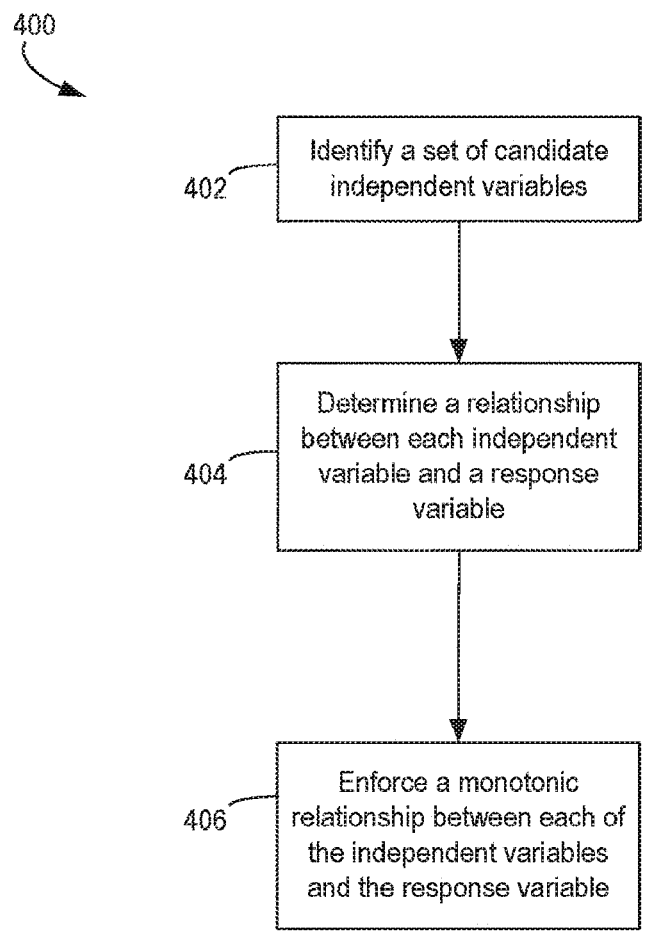
FIG. 4 is a flow chart depicting an example of a process for identifying independent variables to be used in the training process of FIG. 3, according to certain aspects of the present disclosure.

For example, FIG. 4 is a flow chart depicting an example of a process 400 for identifying independent variables to be used in training a tree-based machine-learning model. For illustrative purposes, the process 400 is described with reference to various examples described herein. But other implementations are possible.

In block 402, the process 400 involves identifying a set of candidate independent variables. For example, the model-development engine 108 can obtain the independent variables from an independent variable database or other data structure stored in the network-attached data stores 110.

In block 404, the process 400 involves determining a relationship between each independent variable and a response variable. In some aspects, the model-development engine 108 determines the relationship by, for example, using the independent variable analysis module 204 of FIG. 2. The model-development engine 108 can perform an exploratory data analysis on a set of candidate independent variables, which involves analyzing each independent variable and determining the relationship between each independent variable and the response variable. In some aspects, a measure (e.g., correlation) of the relationship between the independent variable and the response variable can be used to quantify or otherwise determine the relationship between the independent variable and response variable.

In block 406, the process 400 involves enforcing a monotonic relationship (e.g., a positive monotonic relationship or a negative monotonic relationship) between each of the independent variables and the response variable. For example, a monotonic relationship exists between the independent variable and the response variable if the response variable increases as the independent variable increases or if the response variable decreases as the independent variable increases.

The model-development engine 108 can identify or determine a set of independent variables that have a pre-specified relationship with the response variable by, for example, using the independent variable reduction module 208 of FIG. 2. In some aspects, the model-development engine 108 can also reject or remove independent variables that do not have a monotonic relationship with the response variable.

Examples of Building and Training Tree-Based Machine-Learning Models

In some aspects, the model-development engine 108 can be used to generate tree-based machine-learning models that comply with one or more constraints imposed by, for example, regulations, business policies, or other criteria used to generate risk evaluations or other predictive modeling outputs. Examples of these tree-based machine-learning models include, but are not limited to, gradient boosted machine models and random forest models. The tree-based machine-learning models generated with the model-development engine 108 can allow for nonlinear relationships and complex nonlinear interactions. The model-development engine 108 can generate these tree-based machine-learning models subject to, for example, a monotonicity constraint. In some aspects, the tree-based machine-learning models can also provide improved predictive power as compared to other modeling techniques (e.g., logistic regression), while also being usable for generating explanatory data (e.g., adverse action reason codes) indicating the relative impacts of different independent variables on a predicted response (e.g., a risk indicator).

Figure 5:
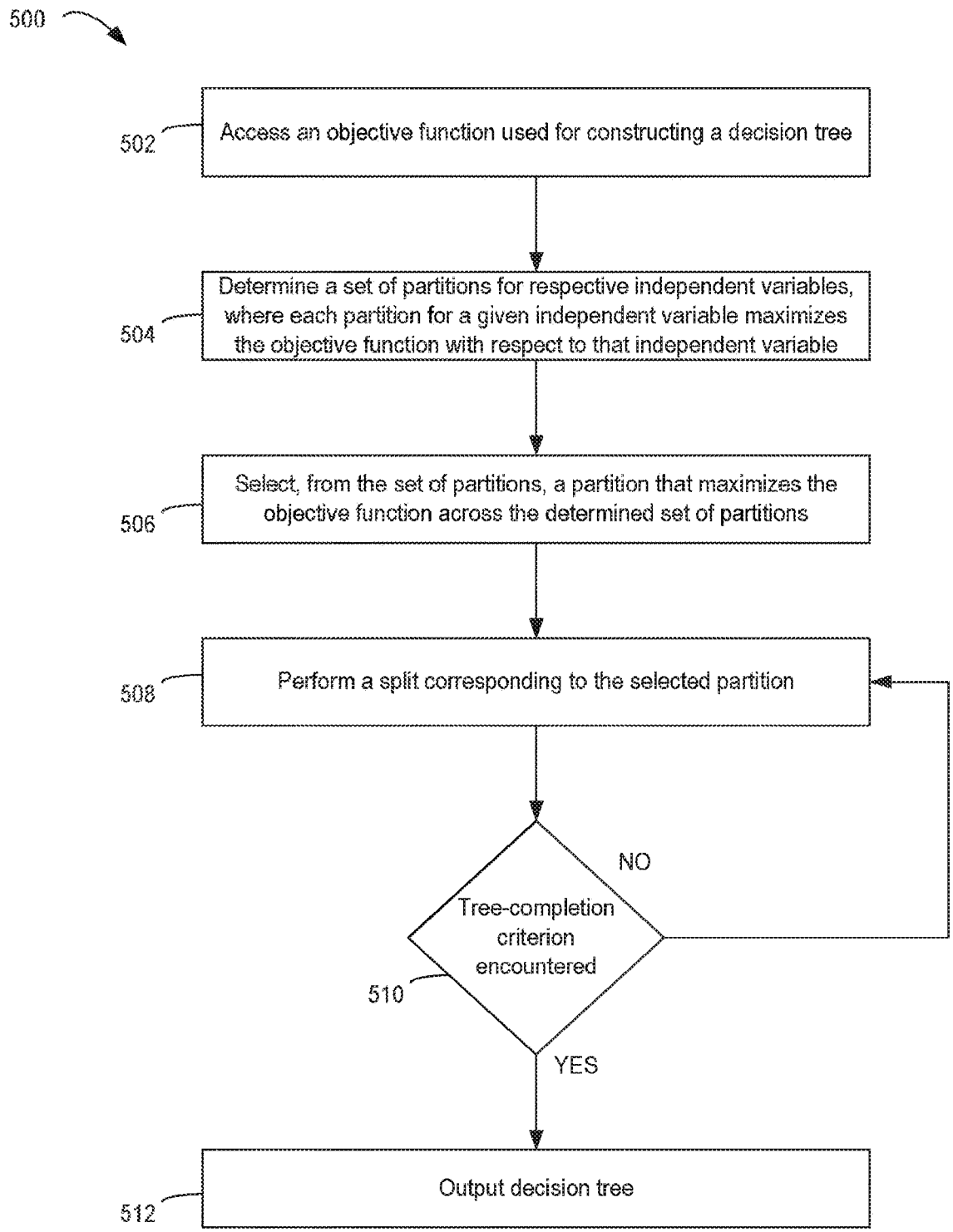
FIG. 5 is a flow chart depicting an example of a process for creating a decision tree used in a tree-based machine-learning model in the process of FIG. 3, according to certain aspects of the present disclosure.

FIG. 5 depicts an example of a process 500 for creating a decision tree. For illustrative purposes, the process 500 is described with reference to various examples described herein. But other implementations are possible.

In block 502, the process 500 involves accessing an objective function used for constructing a decision tree. For example, the model-development engine 108 can retrieve the objective function from a non-transitory computer-readable medium. The objective function can be stored in the non-transitory computer-readable medium based on, for example, one or more user inputs that define, specify, or otherwise identify the objective function. In some aspects, the model-development engine 108 can retrieve the objective function based on one or more user inputs that identify a particular objective function from a set of objective functions (e.g., by selecting the particular objective function from a menu).

In block 504, the process 500 involves determining a set of partitions for respective independent variables, where each partition for a given independent variable maximizes the objective function with respect to that independent variable. For instance, the model-development engine 108 can partition, for each independent variable in the set X, a corresponding set of the data samples 112 (i.e., independent variable values). The model-development engine 108 can determine the various partitions that maximize the objective function.

In block 506, the process 500 involves selecting, from the set of partitions, a partition that maximizes the objective function across the determined set of partitions. For instance, the model-development engine 108 can select a partition that results in an overall maximized value of the objective function as compared to each other partition in the set of partitions.

In block 508, the process 500 involves performing a split corresponding to the selected partition. For example, the model-development engine 108 can perform a split that results in two child node regions, such as a left-hand region $R_L$ and a right-hand region $R_R$.

In block 510, the process 500 involves determining if a tree-completion criterion has been encountered. Examples of tree-completion criterion include, but are not limited to: the tree is built to a pre-specified number of terminal nodes, or a relative change in the objective function has been achieved. The model-development engine 108 can access one or more tree-completion criteria stored on a non-transitory computer-readable medium and determine whether a current state of the decision tree satisfies the accessed tree-completion criteria. If not, the process 500 returns to block 508. If so, the process 500 outputs the decision tree, as depicted at block 512. Outputting the decision tree can include, for example, storing the decision tree in a non-transitory computer-readable medium, providing the decision tree to one or more other processes, presenting a graphical representation of the decision tree on a display device, or some combination thereof.

Regression and classification trees partition the independent variable space into disjoint regions, $R_k$ (k=1, ..., K). Each region is then assigned a representative response value $\beta_k$. A decision tree T can be specified as:

$$T(x; \Theta) = \sum_{k=1}^{K} \beta_k I(x \in R_k), \tag{1}$$

where $\Theta = \{R_k, \beta_k\}_1^K$, $I(\bullet)=1$ if the argument is true and 0 otherwise, and all other variables previously defined. The parameters of Equation (1) are found by maximizing a specified objective function L:

$$\hat{\Theta} = \text{argmax}_\Theta \sum_{i=1}^{n} L(y_i, T(x_i; \Theta)). \quad (2)$$

The estimates, $\hat{R}_k$, of $\hat{\Theta}$ can be computed using a greedy (i.e. choosing the split that maximizes the objective function), top-down recursive partitioning algorithm, after which estimation of $\beta_k$ is superficial (e.g., $\hat{\beta}_k = f(y_i \in \hat{R}_k)$).

A random forest model is generated by building independent trees using bootstrap sampling and a random selection of independent variables as candidates for splitting each node. The bootstrap sampling involves sampling certain training data (e.g., data samples 112 and 116) with replacement, so that the pool of available data samples is the same between different sampling operations. Random forest models are an ensemble of independently built tree-based models. Random forest models can be represented as:

$$F_M(x; \Omega) = q \sum_{m=1}^{M} T_m(x; \Theta_m), \quad (3)$$

where M is the number of independent trees to build, $\Omega = \{\Theta_m\}_1^M$, and q is an aggregation operator or scalar (e.g., $q = M^{-1}$ for regression), with all other variables previously defined.

Figure 6:
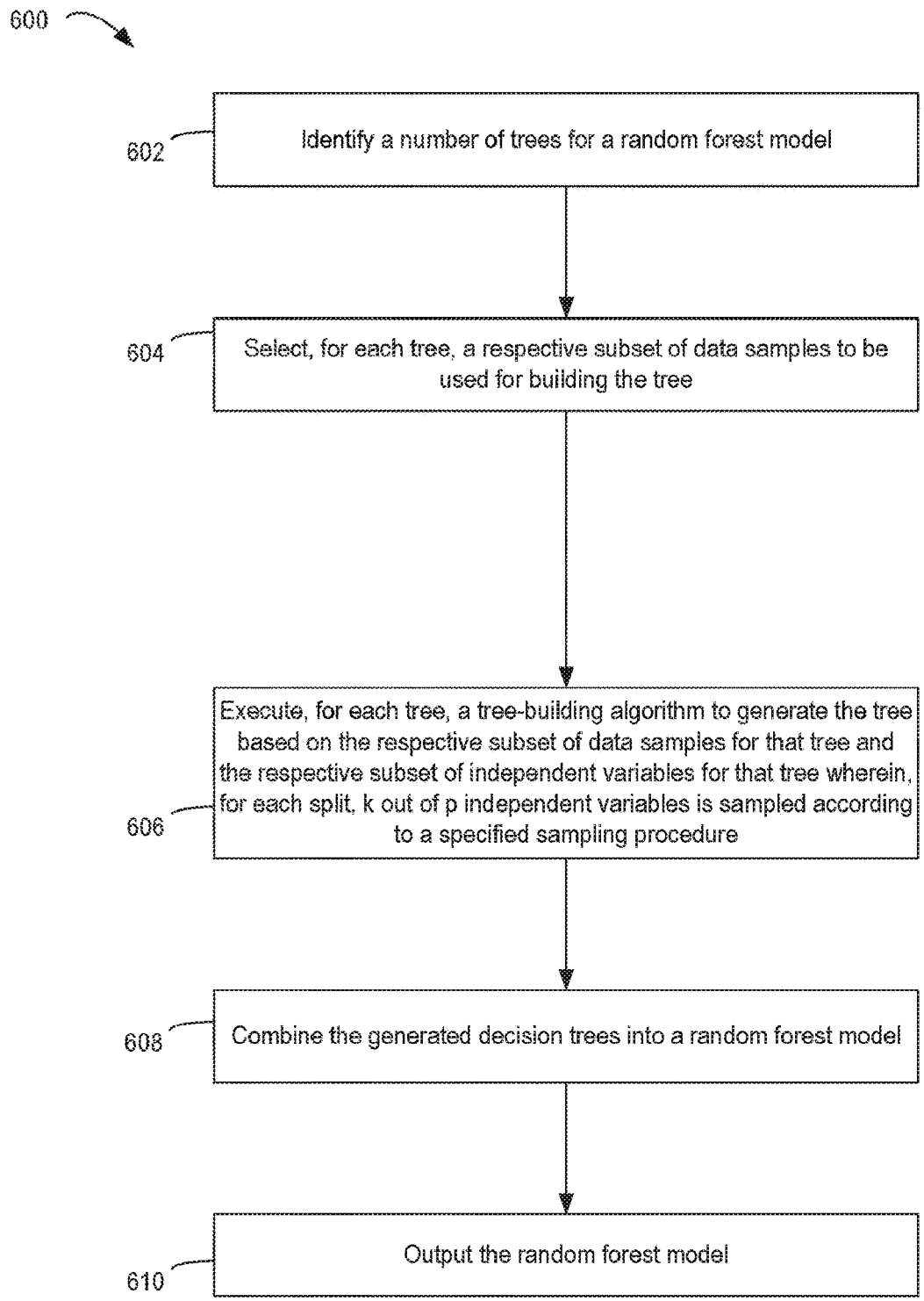
FIG. 6 is a flow chart depicting an example of a process for creating a random forest model that can be the tree-based machine-learning model in the process of FIG. 3, according to certain aspects of the present disclosure.

FIG. 6 is a flow chart depicting an example of a process 600 for creating a random forest model. For illustrative purposes, the process 600 is described with reference to various examples described herein. But other implementations are possible.

In block 602, the process 600 involves identifying a number of trees for a random forest model. The model-development engine 108 can select or otherwise identify a number M of independent trees to be included in the random forest model. For example, the number M can be stored in a non-transitory computer-readable medium accessible to the model-development engine 108, can be received by the model-development engine 108 as a user input, or some combination thereof.

In block 604, the process 600 involves, for each tree from 1 ... M, selecting a respective subset of data samples to be used for building the tree. For example, for a given set of the trees, the model-development engine 108 can execute one or more specified sampling procedures to select the subset of data samples. The selected subset of data samples is a bootstrap sample for that tree.

In block 606, the process 600 involves, for each tree, executing a tree-building algorithm to generate the tree based on the respective subset of data samples for that tree. In block 606, the process 600 involves for each split in the tree building process to select k out of p independent variables for use in the splitting process using the specified objective function. For example, for a given set of the trees, the model-development engine 108 can execute the process 500.

In block 608, the process 600 involves combining the generated decision trees into a random forest model. For example, the model-development engine 108 can generate a random forest model $F_M$ by summing the generated decision trees according to the function $$F_M(x; \hat{\Omega}) = q \sum_{m=1}^{M} T_m(x; \hat{\Theta}_m).$$

In block 610, the process 600 involves outputting the random forest model. Outputting the random forest model can include, for example, storing the random forest model in a non-transitory computer-readable medium, providing the random forest model to one or more other processes, presenting a graphical representation of the random forest model on a display device, or some combination thereof.

Gradient boosted machine models can also utilize tree-based models. The gradient boosted machine model can be generalized to members of the underlying exponential family of distributions. For example, these models can use a vector of responses, $y = \{y_i\}_1^n$, satisfying $$y = \mu + e, \quad (4)$$

and a differentiable monotonic link function $F(\bullet)$ such that $$F_M(\mu) = \sum_{m=1}^{M} T_m(x; \Theta_m), \quad (5)$$

where, $m = 1, \ldots, M$ and $\Theta = \{R_k, \beta_k\}_1^K$. Equation (5) can be rewritten in a form more reminiscent of the generalized linear model as $$F_M(\mu) = \sum_{m=1}^{M} X_m \beta_m \quad (6)$$

where, $X_m$ is a design matrix of rank k such that the elements of the $i^{th}$ column of $X_m$ include evaluations of $I(x \in R_k)$ and $\beta_m = \{\beta\}_1^k$. Here, $X_m$ and $\beta_m$ represent the design matrix (basis functions) and corresponding representative response values of the $m^{th}$ tree. Also, e is a vector of unobserved errors with $E(e|\mu) = 0$ and $$\text{cov}(e|\mu) = R_\mu. \quad (7)$$

Here, $R_\mu$ is a diagonal matrix containing evaluations at $\mu$ of a known variance function for the distribution under consideration.

Estimation of the parameters in Equation (5) involves maximization of the objective function $$\hat{\Theta} = \text{argmax}_\Theta \sum_{i=1}^{n} L\left(y_i, \sum_{m=1}^{M} T_m(x_i; \Theta_m)\right). \quad (8)$$

In some cases, maximization of Equation (8) is computationally expensive. An alternative to direct maximization of Equation (8) is a greedy stagewise approach, represented by the following function:

$$\hat{\Theta}_m = \text{argmax}_\Theta \sum_{i=1}^{n} L(y_i, T_m(x_i; \Theta_m) + v). \quad (9)$$

Thus, $$F_m(\mu) = T_m(x; \Theta_m) + v \quad (10)$$

where, $$v = \sum_{j=1}^{m-1} F_j(\mu) = \sum_{j=1}^{m-1} T_j(x; \Theta_j).$$

Methods of estimation for the generalized gradient boosting model at the $m^{th}$ iteration are analogous to estimation in the generalized linear model. Let $\hat{\Theta}_m$ be known estimates of $\Theta_m$ and $\hat{\mu}$ is defined as $$\hat{\mu} = F_m^{-1}[T_m(x;\hat{\Theta}_m)+v]. \tag{11}$$

Letting $$z = F_m(\hat{\mu}) + F_m'(\hat{\mu})(y-\hat{\mu}) - v \tag{12}$$

then, the following equivalent representation can be used:

$$z|\Theta_m \sim N[T_m(x;\Theta_m), F_m'(\hat{\mu})R_{\hat{\mu}}F_m'(\hat{\mu})]. \tag{13}$$

Letting $\Theta_m$ be an unknown parameter, this takes the form of a weighted least squares regression with diagonal weight matrix $$\hat{W} = R_{\hat{\mu}}^{-1}[F'(\hat{\mu})]^{-2}. \tag{14}$$

Table 1 includes examples of various canonical link functions $\hat{W}=R_{\hat{\mu}}$.

TABLE 1

| Distribution | F (μ) | Weight |
|---|---|---|
| Binomial | $\log[\mu/(1-\mu)]$ | $\mu(1-\mu)$ |
| Poisson | $\log(\mu)$ | $\mu$ |
| Gamma | $\mu^{-1}$ | $\mu^{-2}$ |
| Gaussian | $\mu$ | 1 |

The response z is a Taylor series approximation to the linked response F(y) and is analogous to the modified dependent variable used in iteratively reweighted least squares. The objective function to maximize corresponding to the model for z is $$L(\Theta_m, R; z) = \\ -\frac{1}{2}\log|\phi V| - \frac{1}{2\phi}(z-T_m(x;\Theta_m))^T V^{-1}(z-T_m(x;\Theta_m)) - \frac{n}{2}\log(2\pi) \tag{15}$$

where, $V = W^{-1/2}R_\mu W^{-1/2}$ and $\phi$ is an additional scale/dispersion parameter.

Estimation of the components in Equation (5) are found in a greedy forward stage-wise fashion, fixing the earlier components.

Figure 7:
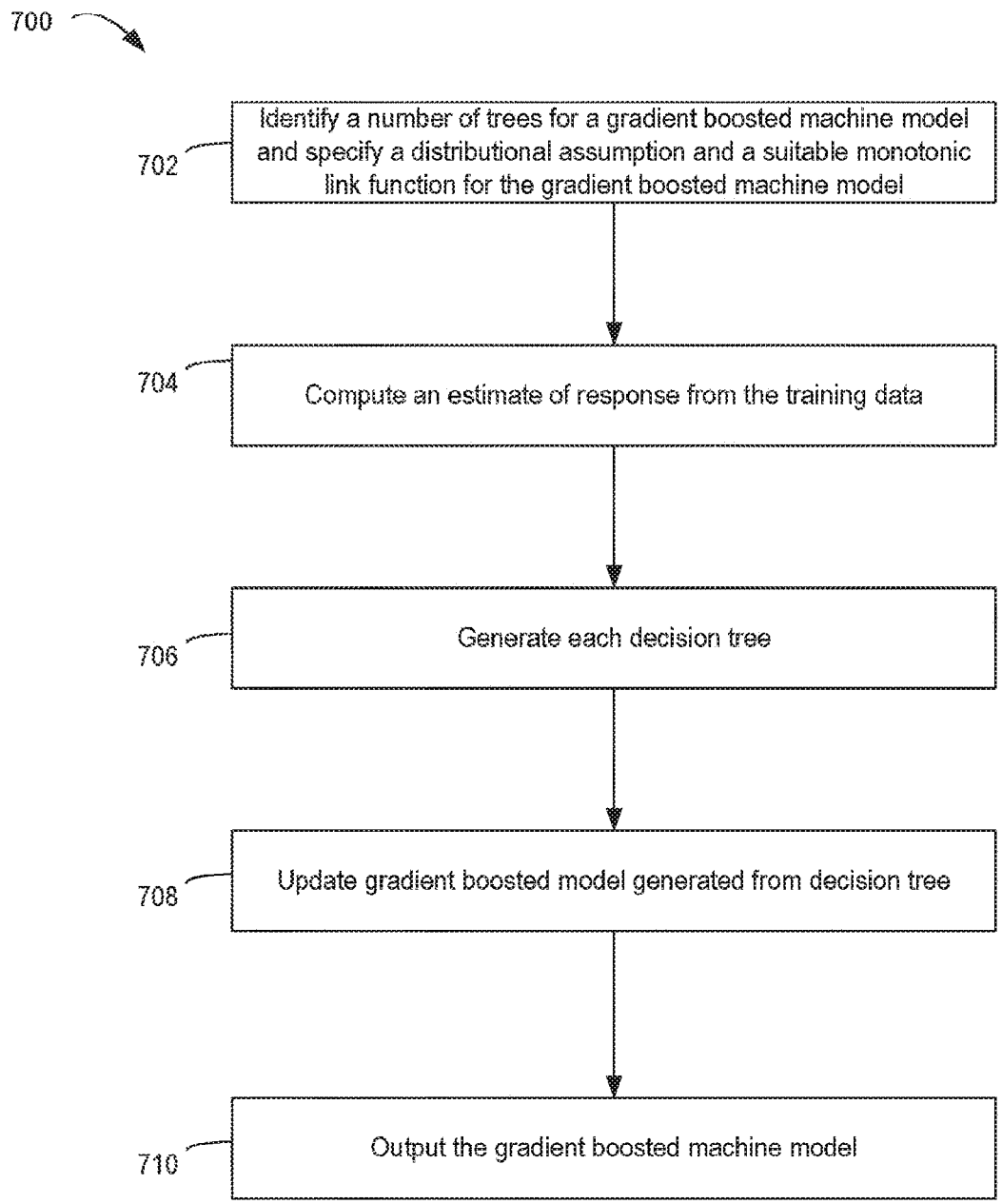
FIG. 7 is a flow chart depicting an example of a process for creating a gradient boosted machine model that can be the tree-based machine-learning model in the process of FIG. 3, according to certain aspects of the present disclosure.

FIG. 7 is a flow chart depicting an example of a process 700 for creating a gradient boosted machine model. For illustrative purposes, the process 700 is described with reference to various examples described herein. But other implementations are possible.

In block 702, the process 700 involves identifying a number of trees for a gradient boosted machine model and specifying a distributional assumption and a suitable monotonic link function for the gradient boosted machine model. The model-development engine 108 can select or otherwise identify a number M of independent trees to be included in the gradient boosted machine model and a differentiable monotonic link function F(•) for the model. For example, the number M and the function F(•) can be stored in a non-transitory computer-readable medium accessible to the model-development engine 108, can be received by the model-development engine 108 as a user input, or some combination thereof.

In block 704, the process 700 involves computing an estimate of μ, $\hat{\mu}$ from the training data or an adjustment that permits the application of an appropriate link function $\left(\text{e.g. } \hat{\mu} = n^{-1}\sum_{i=1}^{n} y_i\right)$, and set $v_0 = F_0(\hat{\mu})$, and define $R_{\hat{\mu}}$. In block 706, the process 700 involves generating each decision tree. For example, the model-development engine 108 can execute the process 500 using an objective function such as a Gaussian log likelihood function (e.g., Equation 15). The model-development engine 108 can regress z to x with a weight matrix $\hat{W}$. This regression can involve estimating the $\Theta_m$ that maximizes the objective function in a greedy manner.

In block 708, the process 700 involves updating $v_m = v_{m-1} + T_m(x; \hat{\Theta}_m)$ and setting $\hat{\mu} = F_m^{-1}(v_m)$. The model-development engine 108 can execute this operation for each tree.

In block 710, the process 700 involves outputting the gradient boosted machine model. Outputting the gradient boosted machine model can include, for example, storing the gradient boosted machine model in a non-transitory computer-readable medium, providing the gradient boosted machine model to one or more other processes, presenting a graphical representation of the gradient boosted machine model on a display device, or some combination thereof.

Figure 8:
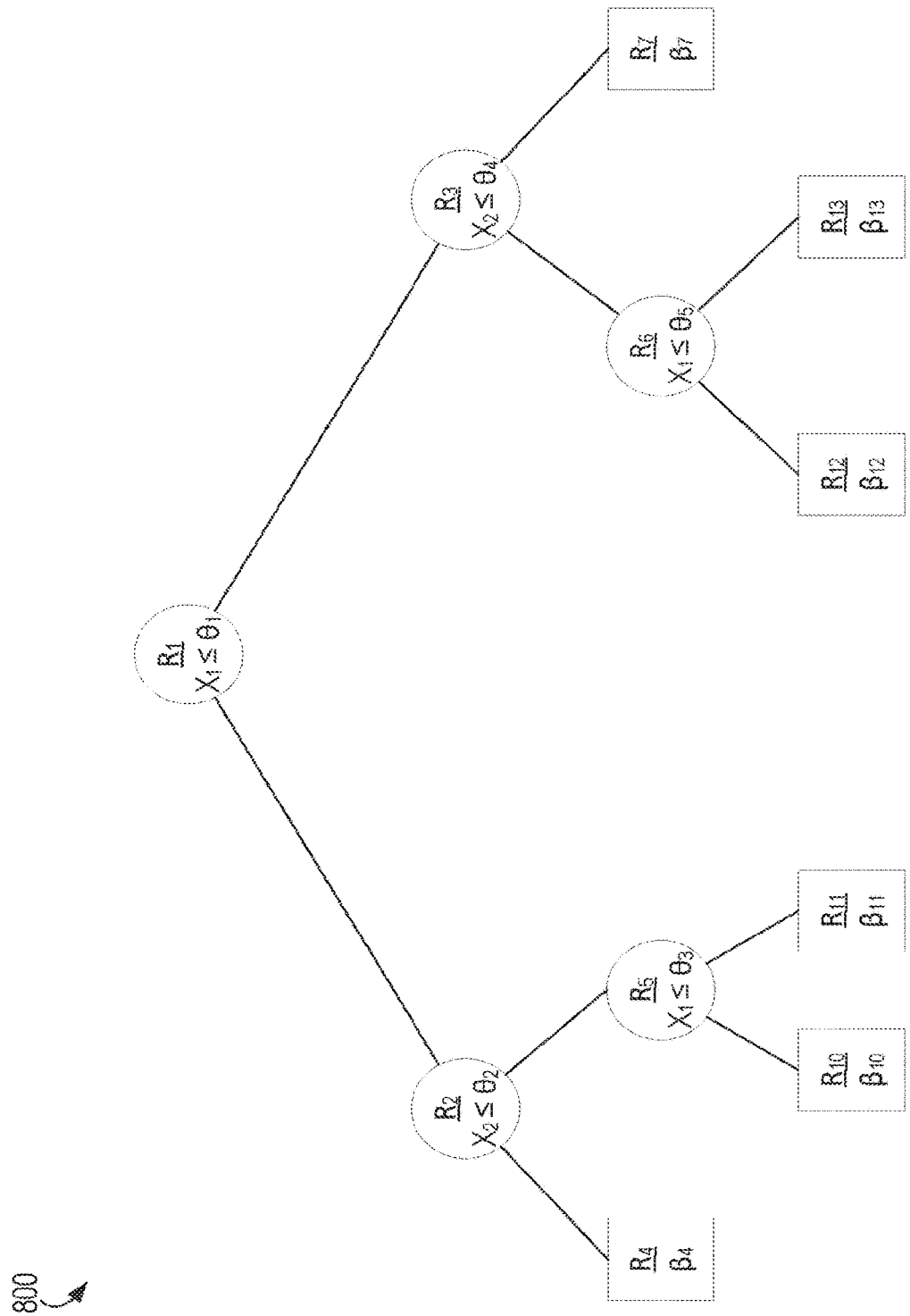
FIG. 8 is a diagram depicting an example of a decision tree in a tree-based machine-learning model that can be trained for computing predicted outputs and explanatory data, according to certain aspects of the present disclosure.

The model-development engine 108 can generate a tree-based machine-learning model that includes a set of decision trees. FIG. 8 graphically depicts an example of a decision tree 800 that can be generated by executing a recursive partitioning algorithm. The model-development engine 108 can execute a recursive partitioning algorithm to construct each decision tree 800, which form a tree-based electronic memory structure stored in a non-transitory computer-readable medium. The recursive partitioning algorithm can involve, for each node in the decision tree, either splitting the node into two child nodes, thereby making the node a decision node, or not splitting the node, thereby making the node a terminal node. Thus, the decision tree 800 can be a memory structure having interconnected parent nodes and terminal nodes, where each parent node includes a respective splitting variable (e.g., one of the independent variables) that causes the parent node to be connected via links to a respective pair of child nodes. The terminal nodes includes respective representative response values based on values of the splitting variables (e.g., means of the set of response variable values in a partition determined by a splitting variable value).

For illustrative purposes, the nodes of the decision tree 800 are identified using a labeling scheme in which the root node is labeled 1 and a node with label j has a left child with label 2j and a right child with label (2j+1). For example, the left child of node 1 is node 2, the right child of node 2 is node 5 (i.e., 2×2+1), and the left and right children of node 5 are node 10 (i.e., 2×5) and node 11 (i.e., 2×2+1) respectively.

The recursive partitioning algorithm can perform the splits based on a sequence of hierarchical splitting rules. An example of a splitting rule is the function $(x_j \leq \theta_k)$ where $x_j$ is an element of the independent variable vector $x=(x_1, x_2, \ldots, x_p)$ and $\theta_k$ is a threshold value specific to the kth parent node. The model-development engine 108 can determine a splitting rule $(x_j \leq \theta_k)$ at each node by selecting the independent variable $x_j$ and a corresponding threshold value $\theta_k$. The model-development engine 108 can apply the splitting rule by dividing a set of data samples 112 into partitions based on the values of one or more independent variables 114 (i.e., $x=(x_1, x_2, \ldots, x_p)$).

In some aspects, the model-development engine 108 selects the independent variable $x_j$ and the threshold value $\theta_k$ such that an objective function is optimized. Examples of suitable objective functions include a sum of squared errors, a Gini coefficient function, and a log-likelihood function.

In this example, the model-development engine 108 can compute a representative response value, $\beta_k$, for each of the terminal node region $R_4$, $R_7$, $R_{10}$, $R_{11}$, $R_{12}$, and $R_{13}$. Each terminal node represents a subset of the data samples 112, where the subset of the data samples 112 is selected based on the values of one or more independent variables 114 with respect to the splitting rules, and a corresponding subset of the data samples 116. The model-development engine 108 uses the corresponding subset of the data samples 116 to compute a representative response value $\beta_k$. For example, the model-development engine 108 can identify the subset of data samples 112 (i.e., independent variable data samples) for a given terminal node, identify the corresponding subset of data samples 116 (i.e., response variable data samples) for the terminal node, and compute a mean of the values of the subset of data samples 116 (i.e., a mean response variable value). The model-development engine 108 can assign a representative response value (e.g. the mean) to the terminal node as the representative response value $\beta_k$.

For illustrative purposes, the decision tree 800 is depicted using two independent variables. However, any suitable number of independent variables may be used to generate each decision tree in a tree-based machine-learning model.

Figure 9:
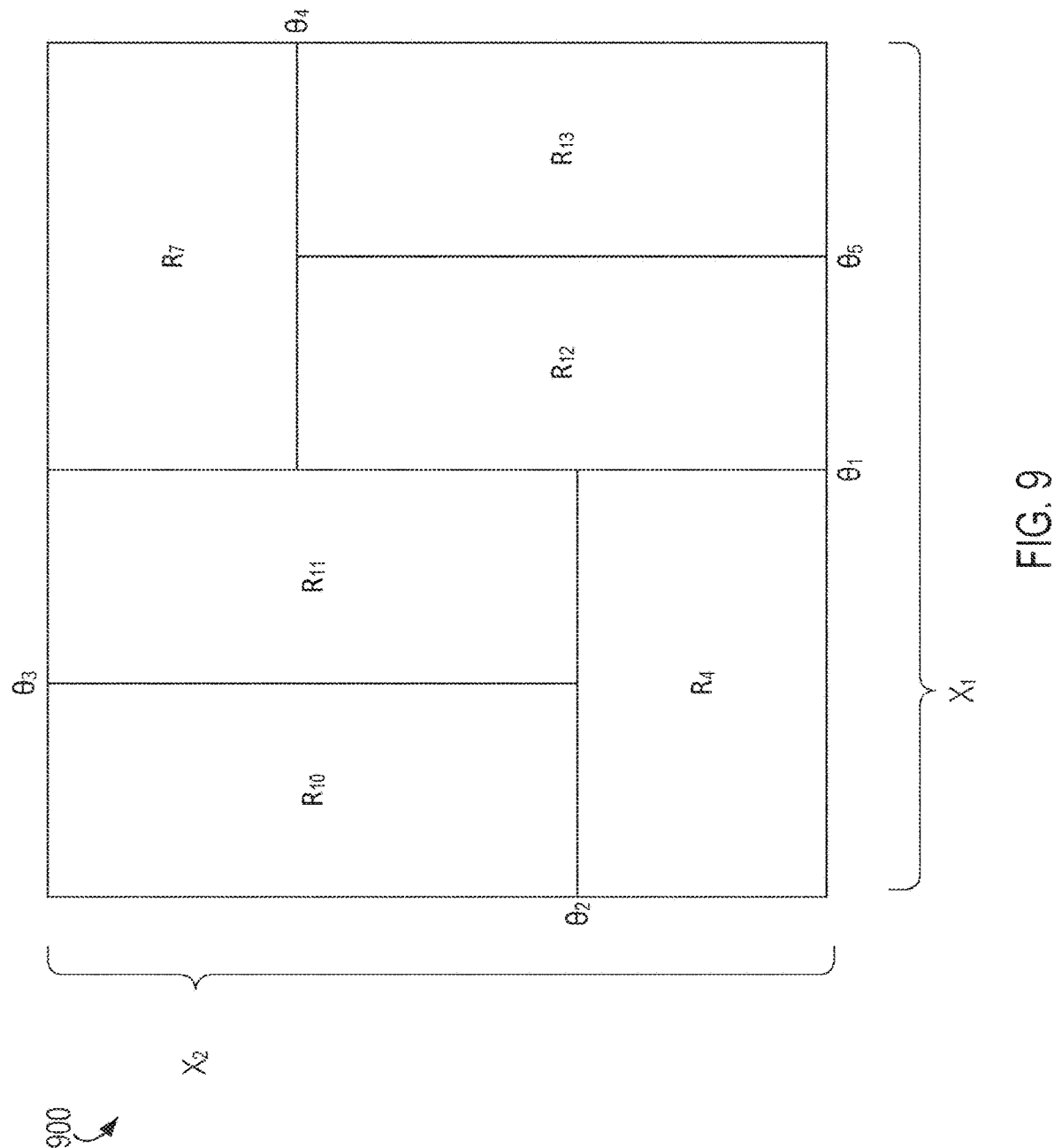
FIG. 9 is a diagram depicting an example of an alternative representation of the decision tree depicted in FIG. 8, according to certain aspects of the present disclosure.

FIG. 9 depicts an example of a tree region 900 that is an alternative representation of the decision tree 800. In this example, the tree region 900 is a two-dimensional region defined by values of two independent variables $x_1$ and $x_2$. But a decision tree can be represented using any number of dimensions defined by values of any suitable number of independent variables.

The tree region 900 includes terminal node regions $R_4$, $R_{10}$, $R_{11}$, $R_{12}$, $R_{13}$, and $R_7$ that respectively correspond to the terminal nodes in decision tree 800. The terminal node regions are defined by splitting rules corresponding to the parent nodes $R_1$, $R_2$, $R_3$, $R_5$, and $R_6$ in the decision tree 800. For example, the boundaries of the region $R_4$ are defined by $\theta_1$ and $\theta_2$ such that the region $R_4$ includes a subset of data samples 112 in which $x_1 < \theta_1$ and $x_2 < \theta_2$.

The model-development engine 108 can ensure monotonicity with respect to the decision trees, such as the decision tree 800 and corresponding tree region 900, in tree-based machine-learning models. Ensuring monotonicity can involve one or more operations that increase a model's compliance with a relevant monotonicity constraint. For instance, the model-development engine 108 can constrain a decision tree to be weak monotone (e.g., non-decreasing) such that $\beta_4 \leq \beta_{10}$, $\beta_4 \leq \beta_{11}$, $\beta_4 \leq \beta_{12}$, $\beta_{10} \leq \beta_{11}$, $\beta_{11} \leq \beta_7$, $\beta_{12} \leq \beta_{13}$, $\beta_{12} \leq \beta_7$, and $\beta_{13} \leq \delta_7$. In this example, a sufficient, but not necessary monotonic constraint is $\beta_4 \leq \beta_{10} \leq \beta_{11} \leq \beta_{12} \leq \beta_{13} \leq \beta_7$.

For a subset $S \subseteq \mathbb{R}^p$, a function $f: \mathbb{R} \to \mathbb{R}$ can be considered monotone on S if, for each $x_j \in S$, and all values of x, $f$ satisfies $$f(x_1, \ldots, x_j + \Delta, \ldots, x_p) \geq f(x_1, \ldots, x_j, \ldots, x_p) \qquad (16)$$

for all $\Delta > 0$ ($f$ is non-decreasing) or for all $\Delta < 0$ ($f$ is non-increasing).

For illustrative purposes, the examples described herein involve monotone, non-decreasing tree-based machine-learning models. A sum-of-trees function (i.e., $F_M(x;\Omega)$) used to build a tree-based machine-learning model from a set of decision trees will also be monotone non-decreasing on S if each of the component trees, $T_m(x;\Theta_m)$, is monotone non-decreasing on S. Thus, the model-development engine 108 can generate a monotonic, tree-based machine-learning model by enforcing monotonicity for each decision tree $T_m(x; \Theta_m)$. Enforcing this monotonicity can include providing constraints on the set of representative response values $\beta_k$, which are determined by the decision tree.

In the tree region 900, terminal node regions are neighboring if the terminal node regions have boundaries which are adjoining in any of the coordinates. A region $R_k$ can be defined as an upper neighboring region of a region $R_{k*}$ if the lower adjoining boundary of the region $R_k$ is the upper adjoining boundary of the region $R_{k*}$. A lower neighboring region can be similarly defined.

For example, in FIG. 9, the terminal node region $R_7$ is an upper neighboring region of regions $R_{11}$, $R_{12}$, and $R_{13}$. The terminal node region $R_4$ is a lower neighboring region of $R_{10}$, $R_{11}$, and $R_{12}$. The terminal node regions $R_4$ and $R_{13}$ are not neighbors. The terminal node regions $R_4$ and $R_{13}$ can be considered disjoint because the $x_1$ upper boundary of the terminal node region $R_4$ is less than the $x_1$ lower boundary of the terminal node region $R_{13}$. For a sufficiently small step size $\Delta$, movement from the terminal node region $R_4$ to the terminal node region $R_{13}$ cannot be achieved by modifying the splitting value of $x_j$.

In some aspects, the model-development engine 108 can track neighbors of various regions using the following scheme. The model-development engine 108 can develop a decision tree $T_m(x; \theta_m)$ with a d-dimensional domain, where the domain is defined by the set $x=(x_1, x_2, \ldots, x_p)$. In this example, $d<p$ if the domain is defined by a subset of the independent variables x selected for the decision tree. Alternatively, $d=p$ if the domain is defined by all of the independent variables x (i.e., the decision tree includes all independent variables).

Each terminal node region of the decision tree $T_m(x;\Theta_m)$ will have the form defined by the following function:

$$R_k = \{x : x_j \in [L_{j,k}, U_{j,k}), j=1, \ldots, d\} \qquad (17).$$

The model-development engine 108 determines an interval $[L_{j,k}, U_{j,k})$ for each $x_i$ from the sequence of splitting rules that result in the region $R_k$. The region $R_k$ is disjoint from the region $R_{k*}$ if $U_{j,k} < L_{j,k}*$ or $L_{j,k} > U_{j,k*}$ for some j. In the tree region 900, the terminal node region $R_4$ is disjoint from the terminal node region $R_7$ because $L_{x_2,7} > U_{x_2,4}$ ($\theta_4 > \theta_2$). Table 2 identifies lower and upper boundaries that define terminal node regions in accordance with the examples of FIGS. 5 and 6.

TABLE 2

| $R_k$ | $L_{x_1,k}$ | $U_{x_1,k}$ | $L_{x_2,k}$ | $U_{x_2,k}$ |
|---|---|---|---|---|
| 4 | 0 | $\theta_1$ | 0 | $\theta_2$ |
| 10 | 0 | $\theta_3$ | $\theta_2$ | 1 |
| 11 | $\theta_3$ | $\theta_1$ | $\theta_2$ | 1 |
| 12 | $\theta_1$ | $\theta_5$ | 0 | $\theta_4$ |
| 13 | $\theta_5$ | 1 | 0 | $\theta_4$ |
| 7 | $\theta_1$ | 1 | $\theta_4$ | 1 |

If the terminal node region $R_k$ and the terminal node region $R_{k*}$ are not disjoint, the terminal node region $R_k$ can be considered as upper neighboring region of the terminal node region $R_{k*}$ if $L_{jk} = U_{jk*}$ for some j. The terminal node region $R_k$ can be considered a lower neighboring region of the terminal node region $R_{k*}$ if $U_{ik} = L_{jk*}$ for some i. In this example, any terminal node region may have multiple upper neighboring regions and lower neighboring regions. A tree function $T_m(x; \Theta_m)$ is monotone and non-decreasing if $\beta_k$ in each terminal node region $R_k$ is less than or equal to the minimum value of all upper neighboring regions for terminal node region $R_k$ and is greater than or equal to the maximum value of all lower neighboring regions for terminal node region $R_k$. The function $T_m(x; \Theta_m)$ is monotone non-decreasing on S if the neighboring regions satisfy these conditions for $x \in S$.

Although this disclosure uses the terms "left," "right," "upper," and "lower" for illustrative purposes, the aspects and examples described herein can be used in other, equivalent manners and structures. For instance, "left" and "lower" are used to indicate a direction in which a decrease in one or more relevant values (e.g., representative response variables) is desirable, but other implementations may use "left" and "lower" to indicate a direction in which an increase in one or more relevant values (e.g., representative response variables) is desirable. Likewise, "right" and "upper" are used to indicate a direction in which an increase in one or more relevant values (e.g., representative response variables) is desirable, but other implementations may use "right" and "upper" to indicate a direction in which a decrease in one or more relevant values (e.g., representative response variables) is desirable. Thus, implementations involving different types of monotonicity, orientations of a decision tree, or orientations of a tree region may be used in accordance with the aspects and examples described herein.

Figure 10:
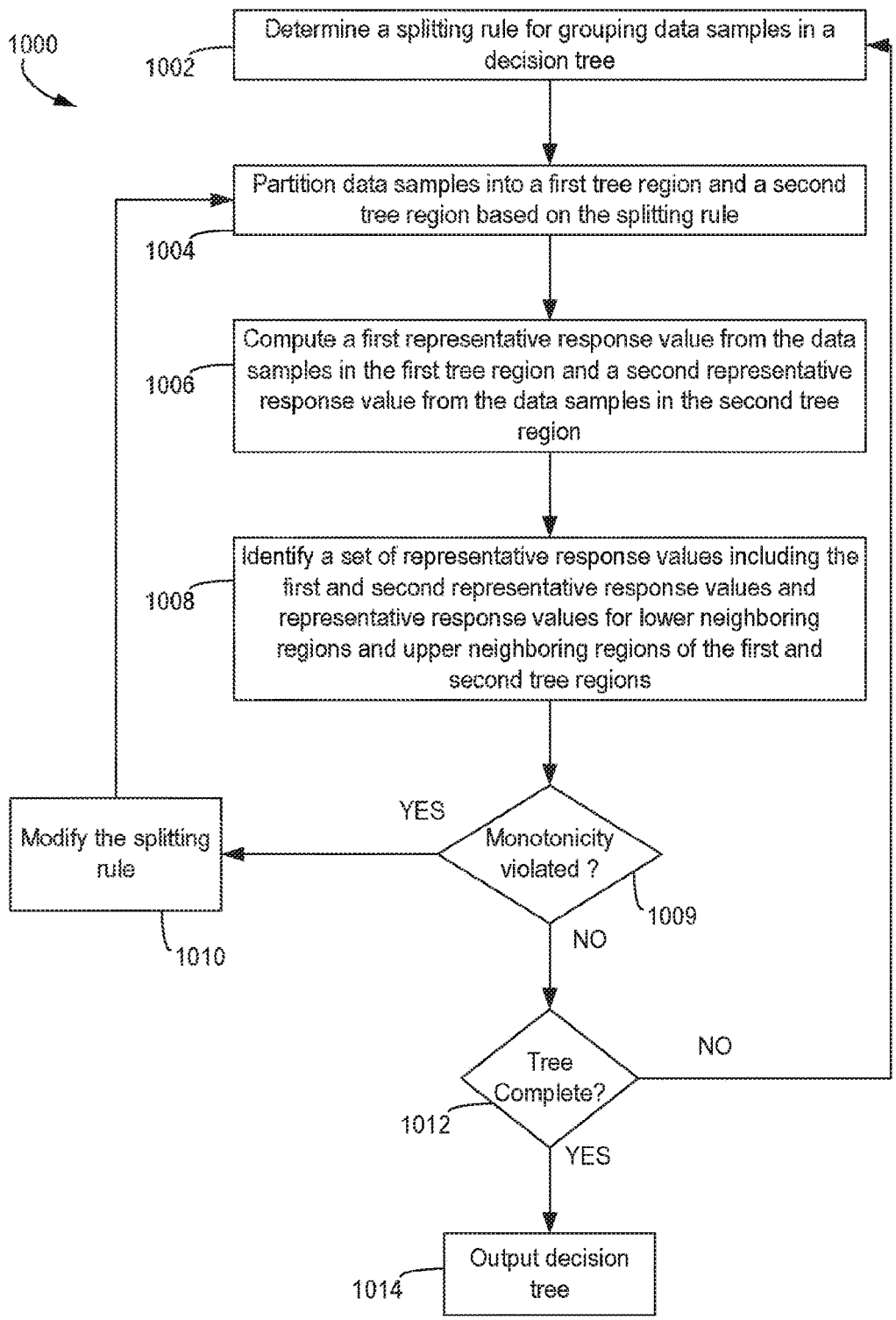
FIG. 10 is a flow chart depicting a an example of a process for enforcing monotonicity among terminal nodes of a decision tree with respect to a relationship between a response and predictors during tree construction with respect to a set of representative response values including representative response values from multiple neighboring tree regions, according to certain aspects of the present disclosure.
Figure 11:
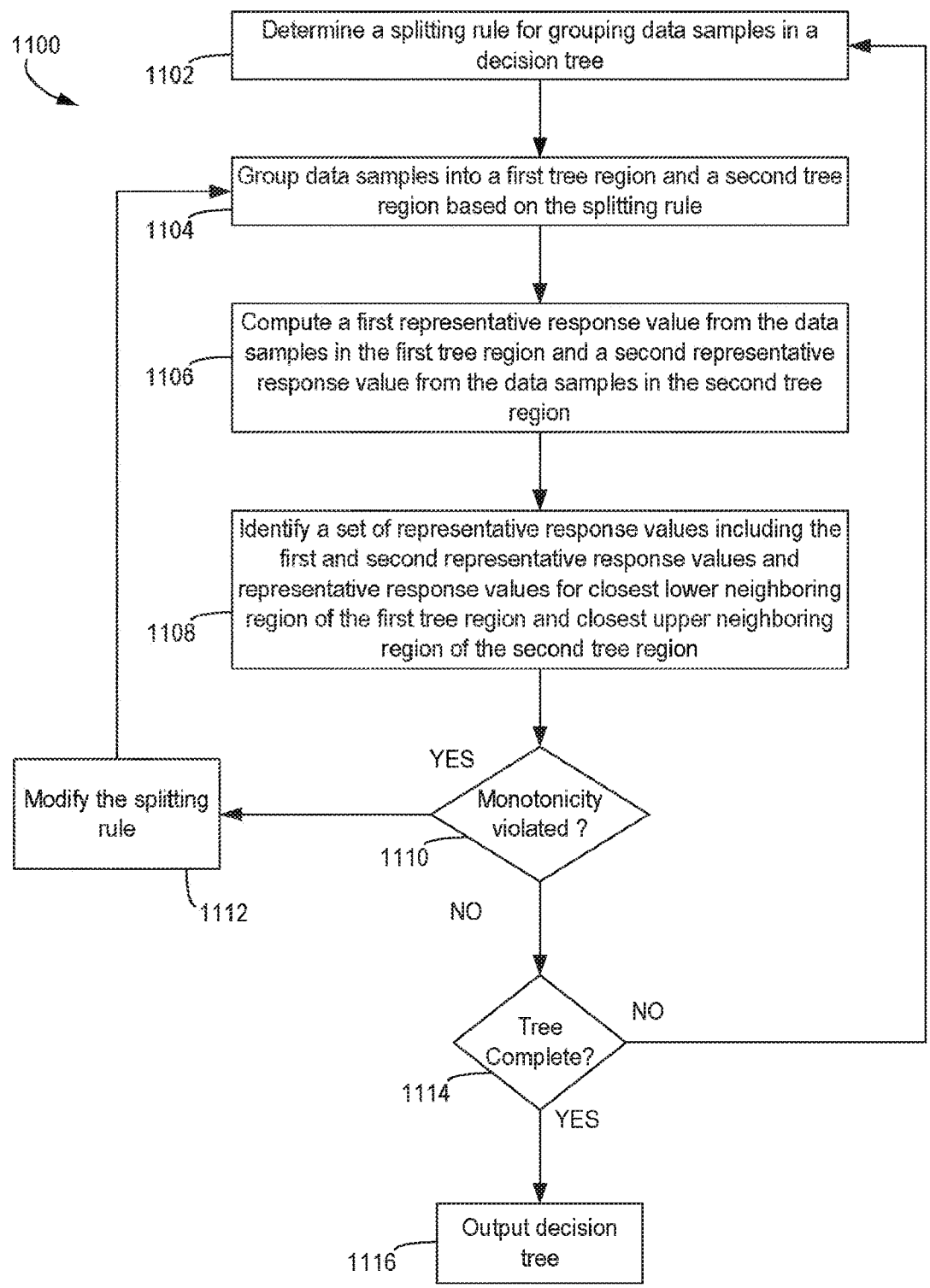
FIG. 11 is a flow chart depicting an example of a process for enforcing monotonicity among terminal nodes of a decision tree with respect to a relationship between a response and predictors during tree construction with respect to a limited set of representative response values including representative response values from closest neighboring tree regions, according to certain aspects of the present disclosure.
Figure 12:
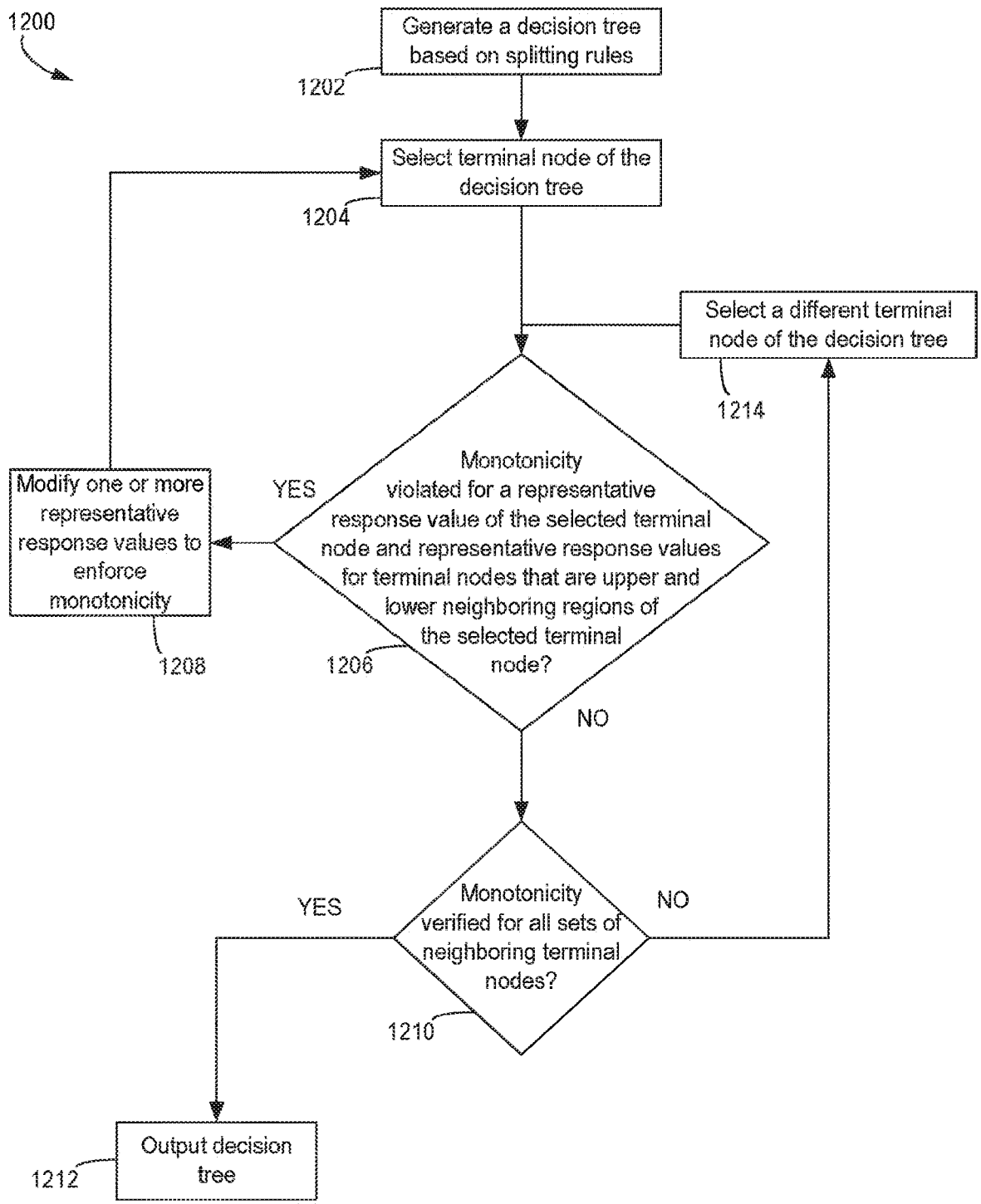
FIG. 12 is a flow chart depicting an example of a process for enforcing monotonicity among neighboring terminal nodes of a decision tree with respect to a relationship between a response and predictors following tree construction, according to certain aspects of the present disclosure.
Figure 13:
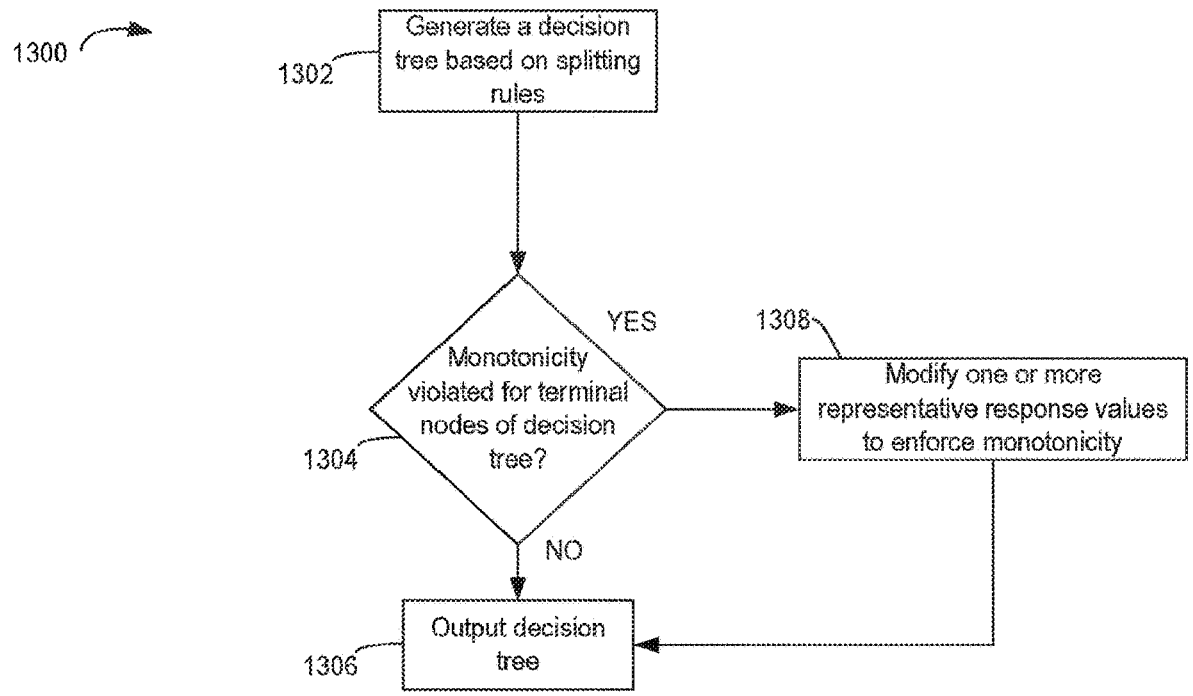
FIG. 13 is a flow chart depicting an example of a process for enforcing monotonicity among terminal nodes of a decision tree with respect to a relationship between a response and predictors following tree construction and without regard to neighbor relationships among the terminal nodes, according to certain aspects of the present disclosure.

FIGS. 10-13 depict examples of suitable algorithms for building and adjusting monotonic decision trees. These algorithms can be used to implement blocks 304-308 of the process 300. The algorithms differ based on whether monotonicity is enforced during tree construction, as depicted in FIGS. 10 and 11, or after tree construction, as depicted in FIGS. 12 and 13. The algorithms also differ based on whether the model-development engine 108 identifies neighboring nodes to enforce monotonicity, as depicted in FIGS. 10 and 12, or enforces monotonicity across a set of terminal nodes without determining all neighboring relationships among the terminal nodes, as depicted in FIGS. 11 and 13.

FIG. 10 depicts an example of a process 1000 for enforcing monotonicity among terminal nodes of a decision tree during tree construction with respect to a set of representative response values including representative response values from multiple neighboring tree regions (e.g., all neighboring tree regions). In the process 1000, the model-development engine 108 monitors a given terminal node and corresponding neighboring nodes of the terminal node each time a split is performed in the construction of the decision tree. For illustrative purposes, the process 1000 is described with reference to various examples described herein. But other implementations are possible.

In block 1002, the process 1000 involves determining a splitting rule for partitioning data samples in a decision tree. For example, the machine-learning model module 210 can access one or more independent variables $x_j$ and one or more threshold values $\theta_j$. In some aspects, the machine-learning model module 210 selects a given independent variable $x_j$ and a corresponding threshold value $\theta_j$, such that an objective function is maximized.

In block 1004, the process 1000 involves partitioning, based on the splitting rule, data samples into a first tree region and a second tree region. For example, the machine-learning model module 210 can access data samples 112, which include values of various independent variables 114, from a data structure stored in the network-attached data stores 110 (or other memory device). The machine-learning model module 210 can identify a first subset of data samples 112 for which the independent variable $x_j$ is less than or equal to a threshold value $\theta_j$. The machine-learning model module 210 can partition the data samples 112 into a left tree region, $R_L$, having a boundary corresponding to $x_j \leq \theta_1$, and a right tree region, $R_R$, having a boundary corresponding to $x_j > \theta_1$.

A particular tree region can be an interim region generated during the tree-building process or a terminal node region. For instance, in the example depicted in FIG. 8, the split represented by $R_2$ results in two tree regions during a tree-building process. The first tree region includes the data samples that are ultimately grouped into the terminal node region $R_4$. The second tree region is an interim region that includes both the data samples that are ultimately grouped into the terminal node region $R_{10}$ and the data samples that are ultimately grouped into the terminal node region $R_{11}$.

In block 1006, the process 1000 involves computing a first representative response value from the data samples in the first tree region and a second representative response value from the data samples in the second tree region. Continuing with the example above, the machine-learning model module 210 can compute a representative response value $\beta_L$ from the data samples in the tree region $R_L$. The machine-learning model module 210 can compute a representative response value $\beta_R$ from the data samples in the tree region $R_R$. For instance, the machine-learning model module 210 can access data samples 116, which include values of one or more response variables 118, from a data structure stored in the network-attached data stores 110 (or other memory device). The machine-learning model module 210 can determine partition data samples 112 and 116 in accordance with the partitions into the tree regions and can compute the corresponding response values from the partitioned data samples 116.

In block 1008, the process 1000 involves identifying a set of representative response values including the first and second representative response values, representative response values for upper neighboring regions and lower neighboring regions of the first tree region, and representative response values for upper neighboring regions and lower neighboring regions of the second tree region. For example, the machine-learning model module 210 can identify both the upper neighboring regions and lower neighboring regions of a given region $R_k$ (e.g., the tree region $R_L$ or the tree region $R_R$). The machine-learning model module 210 can compute, determine, or otherwise identify a set of representative response values for the tree regions that are upper neighboring regions of region $R_k$ and the tree regions that are lower neighboring regions of region $R_k$.

In block 1009, the process 1000 involves determining whether a monotonicity constraint has been violated for the set of representative response values that includes the first and second representative response values. The machine-learning model module 210 can compare the various representative response values in the set to verify that the desired monotonic relationship exists.

For instance, in the example depicted in FIG. 9, a potential split point $\theta_3$ can be generated at block 1002. This split point partitions the tree region defined by $L_{x_1}=0$, $U_{x_1}=\theta_1$, $L_{x_2}=\theta_2$, $U_{x_2}=1$ into $R_{10}$ and $R_{11}$. Thus, a node $R_5$ is partitioned into child nodes $R_{10}$ and $R_{11}$. The machine-learning model module 210 can determine, using the corresponding tree region 900, the boundaries defining $R_{10}$ and $R_{11}$, which are included in Table 2. The machine-learning model module 210 can also determine if $\beta_{10} \leq \beta_{11}$. The machine-learning model module 210 can also determine the upper neighboring regions and lower neighboring regions of both $R_{10}$ and $R_{11}$. For example, as indicated in Table 2 and depicted in FIG. 9, the terminal node regions $R_4$, $R_{12}$, and $R_7$ are at least partially defined by the boundaries $\theta_1$ and $\theta_2$. Thus, the machine-learning model module 210 can identify the terminal node regions $R_4$, $R_{12}$, and $R_7$ as either upper neighboring regions or lower neighboring regions with respect to regions $R_{10}$ and $R_{11}$. The machine-learning model module 210 can implement block 1009 by determining whether $\beta_{10} \leq \beta_{11}$ and, if so, whether each of $\beta_{10}$ and $\beta_{11}$ is less than or equal to the minimum representative response value of all upper neighboring regions and greater than or equal to the maximum representative response value of all lower neighboring regions. If these conditions are not satisfied, then the monotonicity constraint has been violated.

If the model-development engine 108 determines, at block 1009, that the monotonicity constraint has been violated, the process 1000 proceeds to block 1010. In block 1010, the process 1000 involves modifying the splitting rule. In some aspects, the machine-learning model module 210 can modify the splitting rule by modifying the selected independent variable, by modifying the selected threshold value used for splitting, or some combination thereof. For instance, continuing with the example above, if $\beta_{10} > \beta_{11}$, the machine-learning model module 210 may modify the splitting rule that generated $R_{10}$ and $R_{11}$. Modifying the splitting rules may include, for example, modifying the values of $\theta_3$, or splitting on $x_2$ rather than $x_1$. The process 1000 can return to block 1004 and use one or more splitting rules that are modified at block 1010 to regroup the relevant data samples.

If the model-development engine 108 determines, at block 1009, that the monotonicity constraint has not been violated, the process 1000 proceeds to block 1012. In block 1012, the process 1000 involves determining whether the decision tree is complete. For instance, the machine-learning model module 210 can determine whether the decision tree results in an optimized objective function (e.g., SSE, Gini, log-likelihood, etc.) subject to the monotonicity constraint imposed at block 1009. If the decision tree is not complete, the process 1000 returns proceeds to block 1002 and proceeds with an additional split in the decision tree.

The model-development engine 108 can execute any suitable algorithm for implementing blocks 1002-1014. For example, the model-development engine 108 can access an objective function by retrieving the objective function from a non-transitory computer-readable medium. The objective function retrieved based on, for example, one or more user inputs that define, specify, or otherwise identify the objective function. The model-development engine 108 can determine a set of partitions for respective independent variables, where each partition for a given independent variable maximizes the objective function with respect to that independent variable, subject to certain constraints. A first constraint can be that a proposed split into node regions $R_L$ and $R_R$ satisfies $\beta_L \leq \beta_R$. A second constraint can be that, if the first constraint is satisfied, each $\beta_k$ in each node region $R_L$ and $R_R$ must be less than or equal to the minimum value of all of its upper neighboring regions and greater than or equal to the maximum level of all of its lower neighboring regions. If the partition satisfying these constraints exists, the model-development engine 108 can select a partition that results in an overall maximized value of the objective function as compared to each other partition in the set of partitions. The model-development engine 108 can use the selected partition to perform a split that results in two child node regions (i.e., a left-hand node region $R_L$ and a left-hand node region $R_R$).

If the decision tree is complete, the process 1000 proceeds to block 1014. In block 1014, the process 1000 involves outputting the decision tree. For example, the machine-learning model module 210 can store the decision tree in a suitable non-transitory computer-readable medium. The machine-learning model module 210 can iterate the process 1000 to generate additional decision trees for a suitable tree-based machine-learning model. If the tree-based machine-learning model is complete, the model-development engine 108 can configure the machine-learning environment 106 to transmit the tree-based machine-learning model to the automated modeling system 124, to store the tree-based machine-learning model in a non-transitory computer-readable medium accessible to the automated modeling system 124 (e.g., network-attached data stores 110), or to otherwise make the tree-based machine-learning model accessible to the automated modeling system 124.

FIG. 11 depicts an example of a process 1100 for enforcing monotonicity among terminal nodes of a decision tree during tree construction with respect to a limited set of representative response values including representative response values from closest neighboring tree regions. For illustrative purposes, the process 1100 is described with reference to various examples described herein. But other implementations are possible.

In block 1102, the process 1100 involves determining a splitting rule for partitioning data samples in a decision tree. The machine-learning model module 210 can implement block 1102 in a manner similar to block 1002 of the process 1000, as described above.

In block 1104, the process 1100 involves partitioning data samples into a first tree region and a second tree region (e.g., a left region $R_L$ and right region $R_R$) based on the splitting rule. The machine-learning model module 210 can implement block 1104 in a manner similar to block 1004 of the process 1000, as described above.

In block 1106, the process 1100 involves computing a first representative response value from the data samples in first tree region and a second representative response value from the data samples in second tree region. The machine-learning model module 210 can implement block 1106 in a manner similar to block 1006 of the process 1000, as described above.

In block 1108, the process 1100 involves identifying a set of representative response values including the first and second representative response values, a representative response value for a closest lower neighboring region of the first tree region, and a representative response value for a closest upper neighboring region of the second tree region. For example, the machine-learning model module 210 can identify the closest lower neighboring region ($R_{L*}$) of $R_L$ and the closest upper neighboring region ($R_{R*}$) of $R_R$. The machine-learning model module 210 can compute, determine, or otherwise identify the representative response values $\beta_{L*}$ and $\beta_{R*}$ for regions $R_{L*}$ and $R_{R*}$, respectively.

A particular neighboring region is the "closest" neighbor to a target region if fewer nodes in the corresponding decision tree must be traversed to reach the node corresponding to the particular neighboring region from the node corresponding to the target region. For example, region $R_{11}$ has lower neighboring regions $R_{10}$ and $R_4$. Region $R_{10}$ is the closest lower neighbor region $R_{11}$ because only one node (the node corresponding to $R_5$) separates $R_{10}$ and $R_{11}$, as compared to two nodes (the nodes corresponding to $R_2$ and $R_5$) separating $R_4$ and $R_{11}$.

In block 1110, the process 1100 involves determining whether a monotonicity constraint has been violated for the set of representative response values. Continuing with the example above, the machine-learning model module 210 can compare the various representative response values to verify that the desired monotonic relationship exists.

For instance, in the example depicted in FIG. 8, $\theta_3$ can be a potential split point generated at block 1102, which partitions the region defined by $L_{x_1}=0$, $U_{x_1}=\theta_1$, $L_{x_2}=\theta_2$, $U_{x_2}=1$ into $R_{10}$ and $R_{11}$. Thus, the node $R_5$ is partitioned into child nodes $R_{10}$ (e.g., a left-hand node) and $R_{11}$ (e.g., a right-hand node). The machine-learning model module 210 can determine, using the corresponding tree region 900, the boundaries defining $R_{10}$ and $R_{11}$. The machine-learning model module 210 can also determine if $\beta_{10} \leq \beta_{11}$. The machine-learning model module 210 can identify the closest lower neighboring region $(R_{L*})$ of $R_{10}$ and the closest upper neighboring region $(R_{R*})$ of $R_{11}$. For example, as depicted in FIG. 9 and indicated in Table 2, the closest lower neighboring region of $R_{10}$ is $R_{L*}=R_4$ and the closest upper neighboring region of $R_{11}$ is $R_{R*}=R_{12}$. Thus, the machine-learning model module 210 can identify the terminal node regions $R_4$ and $R_{12}$ as the closet lower neighboring region of the region $R_{10}$ and the closest upper neighboring region of the region $R_{11}$, respectively. The machine-learning model module 210 can implement block 1110 by determining whether $\beta_4 \leq \beta_{10}$ and whether $\beta_{11} \leq \beta_{12}$.

The model-development engine 108 can execute any suitable algorithm for implementing blocks 1102-1110. For example, the model-development engine 108 can access an objective function by retrieving the objective function from a non-transitory computer-readable medium. The objective function retrieved based on, for example, one or more user inputs that define, specify, or otherwise identify the objective function. The model-development engine 108 can determine a set of partitions for respective independent variables, where each partition for a given independent variable maximizes the objective function with respect to that independent variable, subject to certain constraints. A first constraint can be that a proposed split into node regions $R_L$ and $R_R$ satisfies $\beta_L \leq \beta_R$. If the first constraint is satisfied a second constraint can be that, $\beta_{L*} \leq \beta_L$ and $\beta_R \leq \beta_{R*}$. $\beta_{L*}$ is the representative response value of the closest lower neighboring region $R_{L*}$ to region $R_L$ in the decision tree. $\beta_{R*}$ is the representative response value of the closest upper neighboring region $R_{R*}$ to region $R_R$ in the decision tree. If the partition satisfying these constraints exists, the model-development engine 108 can select a partition that results in an overall maximized value of the objective function as compared to each other partition in the set of partitions. The model-development engine 108 can use the selected partition to perform a split that results in two child node regions (i.e., a left-hand node region $R_L$ and a left-hand node region $R_R$).

If the model-development engine 108 determines, at block 1110, that the monotonicity constraint has been violated, the process 1100 proceeds to block 1112. In block 1112, the process 1100 involves modifying the splitting rule. In some aspects, the machine-learning model module 210 can modify the splitting rule by modifying the selected independent variable, by modifying the selected threshold value used for splitting, or both. For instance, continuing with the example above, if $\beta_{10} > \beta_{11}$, the machine-learning model module 210 may modify the splitting rule that generated $R_{10}$ and $R_{11}$. Modifying the splitting rules may include, for example, modifying the values of $\theta_3$, or splitting on $x_2$ rather than $x_i$. The process 1100 can return to block 1104 and use one or more splitting rules that are modified at block 1112 to repartition the relevant data samples.

If the model-development engine 108 determines, at block 1110, that the monotonicity constraint has not been violated, the process 1100 proceeds to block 1114. In block 1114, the process 1100 involves determining whether the decision tree is complete. The machine-learning model module 210 can implement block 1114 in a manner similar to block 1014 of the process 1000, as described above.

If the decision tree is not complete, the process 1100 returns proceeds to block 1102 and proceeds with an additional split in the decision tree. If the decision tree is complete, the process 1100 proceeds to block 1116. In block 1116, the process 1100 involves outputting the decision tree. The machine-learning model module 210 can configure the machine-learning environment 106 to output the decision tree using any suitable output method, such as the output methods described above with respect to block 1016 of the process 1000.

For illustrative purposes, the processes 1000 and 1100 are described as modifying splitting rules. In some aspects, modifying the splitting rules used by a machine-learning model module 210 can involve selecting and, if necessary, discarding certain candidate splitting rules. For instance, certain operations in these processes can involve selecting, determining, or otherwise accessing a candidate splitting rule and then proceeding with blocks 1004-1009 (in process 1000) or blocks 1104-1110 (in process 1100). If a current candidate splitting rule results in a monotonicity constraint being violated (i.e., at block 1009 or block 1110) and other candidate splitting rules are available, the machine-learning model module 210 can "modify" the splitting rule being used by discarding the current candidate splitting rule and selecting another candidate splitting rule. If a current candidate splitting rule results in a monotonicity constraint being violated (i.e., at block 1009 or block 1110) and other candidate splitting rules are not available, the machine-learning model module 210 can "modify" the splitting rule being used by using an optimal candidate splitting rule, where the optimal candidate splitting rule is either the current candidate splitting rule or a previously discarded candidate splitting rule.

FIG. 12 depicts an example of a process 1200 for enforcing monotonicity among neighboring terminal nodes of a decision tree following tree construction. In the process 1200, the model-development engine 108 generates an unconstrained decision tree that is fitted to the relevant data samples. The model-development engine 108 adjusts the representative response values of the generated decision tree by enforcing a set of constraints among neighboring terminal nodes. For illustrative purposes, the process 1200 is described with reference to various examples described herein. But other implementations are possible.

In block 1202, the process 1200 involves generating a decision tree based on splitting rules. For example, the machine-learning model module 210 can select a subset of the data samples 112 and a corresponding subset of the data samples 116 to a decision tree. The machine-learning model module 210 can fit the selected data samples to a decision tree using various independent variables x and corresponding threshold values $\theta_1$. The machine-learning model module 210 can fit the selected data samples to a decision tree in a manner that optimizes a suitable objective function (e.g., SSE, Gini, log-likelihood, etc.). The machine-learning model module 210 can optimize the objective function at block 1202 without regard to any monotonicity constraint.

In some aspects, the machine-learning model module 210 can implement the block 1202 by executing the process 500. But other implementations are possible.

In block 1204, the process 1200 involves selecting a terminal node of the generated decision tree. In some aspects, the machine-learning model module 210 can identify the "lowest" terminal node region in the tree region 900 for which monotonicity (with respect to neighbor region) has not been verified. As an example, the machine-learning model module 210 can identify the terminal node region $R_4$ (and corresponding terminal value $\beta_4$) at block 1204. In additional or alternative aspects, the machine-learning model module 210 can identify the "highest" terminal node region in the tree region 900 for which monotonicity (with respect to neighbor region) has not been verified. As an example, the machine-learning model module 210 can identify the terminal node region $R_7$ (and corresponding terminal node value $\beta_7$) at block 1204.

In block 1206, the process 1200 involves determining whether a monotonicity constraint has been violated for a representative response value of the selected terminal node and representative response values for terminal nodes that are upper and lower neighboring regions of the selected terminal node. For example, the machine-learning model module 210 can determine, for a terminal node region $R_k$, whether $\beta_k$ is less than or equal to the minimum value of all upper neighboring regions for the terminal node region $R_k$ and whether $\beta_k$ is greater than or equal to the maximum value of all lower neighboring regions for the terminal node region $R_k$. If so, the monotonicity constraint is satisfied. If not, the monotonicity constraint is violated.

In one example involving the selection of the terminal node region $R_4$, the machine-learning model module 210 can identify the terminal node regions $R_{10}$, $R_{11}$, and $R_{12}$ as upper neighboring regions of the terminal node region $R_4$. The machine-learning model module 210 can compare the representative response values of these regions to determine whether $\beta_4 \leq \beta_{10} \leq \beta_{11} \leq \beta_{12}$. Additionally or alternatively, in an example involving the selection of the terminal node region $R_7$, the machine-learning model module 210 can identify the terminal node regions $R_{11}$, $R_{12}$, and $R_{13}$ as lower neighboring regions of the terminal node region $R_7$. The machine-learning model module 210 can compare the representative response values of these regions to determine whether $\beta_{11} \leq \beta_{12} \leq \beta_{13} \leq \beta_7$.

If the monotonicity constraint has been violated for the terminal node and neighbors of the selected terminal node, the process 1200 proceeds to block 1208. In block 1208, the process 1200 involves modifying one or more representative response values to enforce monotonicity. The process 1200 then proceeds to block 1204 and continues as described above. For example, the machine-learning model module 210 can modify one or more of the representative response values to cause $\beta_{11} \leq \beta_{12} \leq \beta_{13} \leq \beta_7$. Modifying one or more of the particular representative response values in a set of representative response values for neighboring regions (i.e., $\beta_{11}$, $\beta_{12}$, $\beta_{13}$, $\beta_7$) can ensure monotonicity among the set of representative response values.

In a simplified example with respect to a particular split $\theta_k$, the machine-learning model module 210 partitions, during the tree construction, a set of data samples 116 into a left-hand node $R_L$ and a right-hand node $R_R$. The machine-learning model module 210 computes an initial left-hand representative response value $\beta_{L,init}$ for the left-hand node by, for example, calculating the mean of the values of relevant data samples 116 in the partition corresponding to the left-hand node $R_L$. The machine-learning model module 210 computes an initial right-hand representative response value $\beta_{R,init}$ for the right-hand node by, for example, calculating the mean of the values of relevant data samples 116 in the partition corresponding to the right-hand node $R_R$. If $\beta_{L,init}$ and $\beta_{R,init}$ cause a monotonicity constraint to be violated, the algorithm changes $\beta_{L,init}$ and $\beta_{R,init}$ such that a monotonicity constraint is enforced. In one example, the machine-learning model module 210 could compute an average (or weighted average) of $\beta_{L,init}$ and $\beta_{R,init}$. The machine-learning model module 210 could change $\beta_{L,init}$ into to $\beta_{L,mod}$ that is the computed average and could also change $\beta_{R,init}$ into to $\beta_{R,mod}$ that is the computed average. Since $\beta_{L,mod} = \beta_{R,mod}$, monotonicity is no longer violated.

If the monotonicity constraint has not been violated for the terminal node and neighbors of the selected terminal node, the process 1200 proceeds to block 1210. In block 1210, the process 1200 involves determining whether monotonicity has been verified for all sets of neighboring terminal nodes under consideration (e.g., all sets of neighboring terminal nodes in the decision tree).

If monotonicity has been verified for all sets of neighboring terminal nodes under consideration, the process 1200 proceeds to block 1212, which involves outputting the decision tree. The machine-learning model module 210 can configure the machine-learning environment 106 to output the decision tree using any suitable output method, such as the output methods described above with respect to block 1016 of the process 1000. In some aspects, the decision tree can be outputted based on one or more convergence criteria being satisfied.

If monotonicity has been verified for all sets of neighboring terminal nodes under consideration, the process 1200 proceeds to block 1214, which involves selecting a different decision node of the decision tree. The process 1200 proceeds to block 1206 and continues as described above. For example, the process 1200 can be iteratively performed, and can cease iteration based on one or more convergence criteria being satisfied.

FIG. 13 depicts an example of a process 1300 for enforcing monotonicity among terminal nodes of a decision tree following tree construction and without regard to neighbor relationships among the terminal nodes. In the process 1300, the model-development engine 108 generates an unconstrained decision tree that is fit to the relevant data samples. The model-development engine 108 adjusts the representative response values of the generated decision tree by enforcing left-to-right monotonicity among the terminal nodes of the generated decision tree. For illustrative purposes, the process 1300 is described with reference to various examples described herein. But other implementations are possible.

In block 1302, the process 1300 involves generating a decision tree based on splitting rules. In some aspects, the machine-learning model module 210 can implement the block 1202 by executing the process 500. But other implementations are possible.

In block 1304, the process 1300 involves determining whether a monotonicity constraint has been violated for all terminal nodes under consideration. The machine-learning model module 210 can identify the terminal nodes of the decision tree. The machine-learning model module 210 can compute, determine, or otherwise identify the representative response values for the terminal nodes. The machine-learning model module 210 can compare these representative response values to determine whether a specified monotonic relationship exists among the values (e.g., $\beta_1 \leq \beta_2 \leq \ldots \leq \beta_K$).

If the monotonicity constraint has not been violated, the process 1300 proceeds to block 1306, which involves outputting the decision tree. The machine-learning model module 210 can configure the machine-learning environment 106 to output the decision tree using any suitable output method, such as the output methods described above with respect to block 1304 of the process 1300.

If the monotonicity constraint has been violated, the process 1300 proceeds to block 1308. In block 1308, the process 1300 involves modifying one or more representative response values to enforce monotonicity. For example, the machine-learning model module 210 can modify one or more of the representative response values to cause $\beta_1 \leq \beta_2 \leq \ldots \leq \beta_K$. Block 1308 can be implemented by smoothing over one or more representative response values in a manner similar to the example described above with respect to block 1208 of process 1200. The process 1300 can proceed to block 1306.

Example of Explanatory Data Generated from Tree-Based Machine-Learning Model

Explanatory data can be generated from a tree-based machine-learning model using any appropriate method described herein. An example of explanatory data is a reason code, adverse action code, or other data indicating an impact of a given independent variable on a predictive output. For instance, explanatory reason codes may indicate why an entity received a particular predicted output. The explanatory reason codes can be generated from the adjusted tree-based machine-learning model to satisfy suitable requirements. Examples of these rules include explanatory requirements, business rules, regulatory requirements, etc.

In some aspects, a reason code or other explanatory data may be generated using a "points below max" approach or a "points for max improvement" approach. Generating the reason code or other explanatory data utilizes the output function $F(x;\Omega)$, where $\Omega$ is the set of all parameters associated with the model and all other variables previously defined. A "points below max" approach determines the difference between, for example, an idealized output and a particular entity (e.g. subject, person, or object) by finding values of one or more independent variables that maximize $F(x;\Omega)$. A "points below max" approach determines the difference between the idealized output and a particular entity by finding values of one or more independent variables that maximize an increase in $F(x;\Omega)$.

The independent variable values that maximize $F(x;\Omega)$ used for generating reason codes (or other explanatory data) can be determined using the monotonicity constraints that were enforced in model development. For example, let $x_j^*$ ($j=1, \ldots, p$) be the right endpoint of the domain of the independent variable $x_j$. Then, for a monotonically increasing function, the output function is maximized at $F(x^*;\Omega)$. Reason codes for the independent variables may be generated by rank ordering the differences obtained from either of the following functions:

$$F[x_1^*, \ldots, x_j^*, \ldots, x_p^*;\Omega] - F[x_1^*, \ldots, x_j, \ldots, x_p^*;\Omega] \quad (1)$$

$$F[x_1, \ldots, x_j^*, \ldots, x_p^*;\Omega] - F[x_1, \ldots, x_j, \ldots, x_p;\Omega] \quad (2)$$

In these examples, the first function is used for a "points below max" approach and the second function is used for a "points for max improvement" approach. For a monotonically decreasing function, the left endpoint of the domain of the independent variables can be substituted into $x_j^*$.

In the example of a "points below max" approach, a decrease in the output function for a given entity is computed using a difference between the maximum value of the output function using x* and the decrease in the value of the output function given x. In the example of a "points for max improvement" approach, a decrease in the output function is computed using a difference between two values of the output function. In this case, the first value is computed using the output-maximizing value for $x_j^*$ and a particular entity's values for the other independent variables. The decreased value of the output function is computed using the particular entity's value for all of the independent variables $x_i$.

Computing Environment Example for Training Operations

Figure 14:
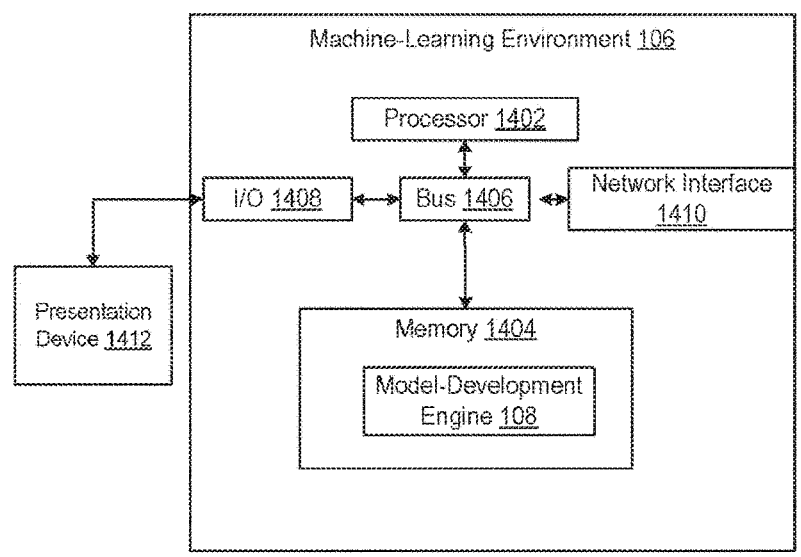
FIG. 14 is a block diagram depicting an example of a computing system that can execute a tree-based machine-learning model-development engine for training a tree-based machine-learning model, according to certain aspects of the present disclosure.

Any suitable computing system or group of computing systems can be used to perform the model training operations described herein. For example, FIG. 14 is a block diagram depicting an example of a machine-learning environment 106. The example of the machine-learning environment 106 can include various devices for communicating with other devices in the operating environment 100, as described with respect to FIG. 1. The machine-learning environment 106 can include various devices for performing one or more of the operations described above with respect to FIGS. 1-13.

The machine-learning environment 106 can include a processor 1402 that is communicatively coupled to a memory 1404. The processor 1402 executes computer-executable program code stored in the memory 1404, accesses information stored in the memory 1404, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 1402 include a microprocessor, an application-specific integrated circuit, a field-programmable gate array, or any other suitable processing device. The processor 1402 can include any number of processing devices, including one. The processor 1402 can include or communicate with a memory 1404. The memory 1404 stores program code that, when executed by the processor 1402, causes the processor to perform the operations described in this disclosure.

The memory 1404 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C#, Visual Basic, Java, Python, Perl, JavaScript, ActionScript, etc.

The machine-learning environment 106 may also include a number of external or internal devices such as input or output devices. For example, the machine-learning environment 106 is shown with an input/output interface 1408 that can receive input from input devices or provide output to output devices. A bus 1406 can also be included in the machine-learning environment 106. The bus 1406 can communicatively couple one or more components of the machine-learning environment 106.

The machine-learning environment 106 can execute program code that includes the model-development engine 108. The program code for the model-development engine 108 may be resident in any suitable computer-readable medium and may be executed on any suitable processing device. For example, as depicted in FIG. 14, the program code for the model-development engine 108 can reside in the memory 1404 at the machine-learning environment 106. Executing the model-development engine 108 can configure the processor 1402 to perform the operations described herein.

In some aspects, the machine-learning environment 106 can include one or more output devices. One example of an output device is the network interface device 1410 depicted in FIG. 14. A network interface device 1410 can include any device or group of devices suitable for establishing a wired or wireless data connection to one or more data networks 104. Non-limiting examples of the network interface device 1410 include an Ethernet network adapter, a modem, etc. Another example of an output device is the presentation device 1412 depicted in FIG. 14. A presentation device 1412 can include any device or group of devices suitable for providing visual, auditory, or other suitable sensory output. Non-limiting examples of the presentation device 1412 include a touchscreen, a monitor, a speaker, a separate mobile computing device, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A method comprising:
generating a tree-based machine-learning model that is a memory structure comprising interconnected parent nodes and terminal nodes, wherein each parent node includes a respective splitting variable that causes the parent node to be connected via links to a respective pair of child nodes, wherein the terminal nodes includes respective representative response values based on values of the splitting variables, wherein generating the tree-based machine-learning model comprises:
determining a splitting rule for partitioning data samples in a decision tree;
partitioning, based on the splitting rule, data samples into a first tree region and a second tree region;
computing a first representative response value from the data samples in first tree region and a second representative response value from the data samples in second tree region, wherein a monotonicity constraint for the decision tree is violated by a set of representative response values including the first and second representative response values, a representative response value for a closest lower neighboring region of the first tree region, and a representative response value for a closest upper neighboring region of the second tree region;
applying a modification to the decision tree by modifying the splitting rule and the set of representative response values to enforce the monotonicity constraint;
computing, with the decision tree having the modification, a first modified representative response value from data samples partitioned into the first tree region and a second modified representative response value from data samples partitioned into the second tree region, wherein:
the monotonicity constraint is satisfied by a modified set of representative response values, and
the modified set of representative response values includes the first and second modified representative response values, the representative response value for the closest lower neighboring region of the first tree region, and the representative response value for the closest upper neighboring region of the second tree region; and outputting the decision tree having the modification; and computing, based on the decision tree as outputted, explanatory data indicating relationships between (i) changes in a response variable computed with the tree-based machine-learning model and (ii) changes in one or more independent variables represented by the tree-based machine-learning model, wherein the independent variables comprise a first independent variable and a second independent variable, and wherein generating the explanatory data for the first independent variable having an input value comprises:

identifying a first optimizing value of the first independent variable and a second optimizing value of the second independent variable that cause the tree-based machine-learning model to output an optimal value for the response variable;

computing an additional value for the response variable by applying the tree-based machine-learning model to the first independent variable having the input value and the second independent variable having the second optimizing value;

computing a difference between the optimal value for the response variable and the additional value for the response variable; and outputting the explanatory data for the first independent variable based on the difference.

2. The method of claim 1, wherein the relationships comprise respective contributions of the one or more independent variables to an output value of the response variable.

3. The method of claim 2, wherein the output value of the response variable comprises a risk assessment.

4. The method of claim 1, wherein generating the explanatory data for the second independent variable having an additional input value comprises:

computing a third value for the response variable by applying the tree-based machine-learning model to the first independent variable having the first optimizing value and the second independent variable having the additional input value;

computing an additional difference between the optimal value for the response variable and the third value for the response variable; and excluding, based on the difference being larger than the additional difference, an explanation of the second independent variable from the explanatory data.

5. The method of claim 4, wherein output values of the response variable comprise risk assessments, respectively.

6. The method of claim 1, wherein the independent variables comprise a first independent variable having a first input value and a second independent variable having a second input value, wherein generating the explanatory data for the first independent variable having the first input value comprises:

identifying a first optimizing value of the first independent variable and a second optimizing value of the second independent variable that cause the tree-based machine-learning model to output an optimal value for the response variable;

computing a first output value for the response variable by applying the tree-based machine-learning model to the first independent variable having the first optimizing value and the second independent variable having the second input value;

identifying a second output value for the response variable that is computed by applying the tree-based machine-learning model to the first independent variable having the first input value and the second independent variable having the second input value;

computing a difference between the first output value and the second output value; and outputting the explanatory data for the first independent variable based on the difference.

7. The method of claim 6, wherein generating the explanatory data for the second independent variable having the second input value comprises:

computing a third output value for the response variable by applying the tree-based machine-learning model to the first independent variable having the first input value and the second independent variable having the second optimizing value;

computing an additional difference between the first output value and the third output value; and excluding, based on the difference being larger than the additional difference, an explanation of the second independent variable from the explanatory data.

8. The method of claim 7, wherein output values of the response variable comprise risk assessments, respectively.

9. A system comprising:

a processor; and a non-transitory computer-readable medium comprising program code stored thereon, wherein the program code is executable by the processor to cause the processor to perform operations comprising:

generating a tree-based machine-learning model that is a memory structure comprising interconnected parent nodes and terminal nodes, wherein each parent node includes a respective splitting variable that causes the parent node to be connected via links to a respective pair of child nodes, wherein the terminal nodes includes respective representative response values based on values of the splitting variables, wherein generating the tree-based machine-learning model comprises:

determining a splitting rule for partitioning data samples in a decision tree;

partitioning, based on the splitting rule, data samples into a first tree region and a second tree region;

computing a first representative response value from the data samples in first tree region and a second representative response value from the data samples in second tree region, wherein a monotonicity constraint for the decision tree is violated by a set of representative response values including the first and second representative response values, a representative response value for a closest lower neighboring region of the first tree region, and a representative response value for a closest upper neighboring region of the second tree region;

applying a modification to the decision tree by modifying the splitting rule and the set of representative response values to enforce the monotonicity constraint;

computing, with the decision tree having the modification, a first modified representative response value from data samples partitioned into the first tree region and a second modified representative response value from data samples partitioned into the second tree region, wherein:

the monotonicity constraint is satisfied by a modified set of representative response values, and the modified set of representative response values includes the first and second modified representative response values, the representative response values, the first and second modified representative response value for the closest lower neighboring region of the first tree region, and the representative response value for the closest upper neighboring region of the second tree region; and outputting the decision tree having the modification; and computing, based on the decision tree as outputted, explanatory data indicating relationships between (i) changes in a response variable computed with the tree-based machine-learning model and (ii) changes in one or more independent variables represented by the tree-based machine-learning model, wherein the independent variables comprise a first independent variable and a second independent variable, and wherein generating the explanatory data for the first independent variable having an input value comprises:

identifying a first optimizing value of the first independent variable and a second optimizing value of the second independent variable that cause the tree-based machine-learning model to output an optimal value for the response variable;

computing an additional value for the response variable by applying the tree-based machine-learning model to the first independent variable having the input value and the second independent variable having the second optimizing value;

computing a difference between the optimal value for the response variable and the additional value for the response variable; and outputting the explanatory data for the first independent variable based on the difference.

10. The system of claim 9, wherein the operations further comprise:

accessing an input dataset comprising a first input, a second input, a third input, and a fourth input, applying, to the input dataset, a decision tree of the tree-based machine-learning model, the decision tree having a first tree region, a second tree region, a third tree region, and a fourth tree region, wherein;
 (a) the first tree region is a closest lower neighboring region of the second tree region,
 (b) the second tree region is a left split of a splitting rule,
 (c) the third tree region is a right split of the splitting rule, and
 (d) the fourth tree region is a closest upper neighboring region of the third tree region; and computing an output dataset comprising:
 (a) a first response value determined by traversing, based on the first input, the decision tree to the first tree region,
 (b) a second response value determined by traversing, based on the second input, the decision tree to the second tree region,
 (c) a third response value determined by traversing, based on the third input, the decision tree to the third tree region, and
 (d) a fourth response value determined by traversing, based on the fourth input, the decision tree to the fourth tree region, wherein the output dataset is monotonic with respect to the input dataset.

11. The system of claim 10, wherein the output dataset being monotonic with respect to the input dataset comprises:
 (a) the first input is larger than the second input, the second input is larger than the third input, the third input is larger than the fourth input, the first response value is larger than the second response value, the second response value is larger than the third response value, and the third response value is larger than the fourth response value; or
 (b) the first input is smaller than the second input, the second input is smaller than the third input, the third input is smaller than the fourth input, the first response value is smaller than the second response value, the second response value is smaller than the third response value, and the third response value is smaller than the fourth response value.

12. The system of claim 10, wherein the operations further comprise generating the explanatory data for a second predictor having an additional input value by:

computing a third value for a risk assessment by applying the tree-based machine-learning model to a first predictor having the first optimizing value and the second predictor having the additional input value;

computing an additional difference between the optimal value for the risk assessment and the third value for the risk assessment; and excluding, based on the difference being larger than the additional difference, an explanation of the second predictor from the explanatory data.

13. The system of claim 12, wherein the first predictor has a first input value and the second predictor has a second input value, and wherein the operation of generating the explanatory data for the first predictor having the first input value comprises:

identifying a first optimizing value of the first predictor and a second optimizing value of the second predictor that cause the tree-based machine-learning model to output an optimal value for the risk assessment;

computing a first output value for the risk assessment by applying the tree-based machine-learning model to the first predictor having the first optimizing value and the second predictor having the second input value;

identifying a second output value for the risk assessment that is computed by applying the tree-based machine-learning model to the first predictor having the first input value and the second predictor having the second input value;

computing a difference between the first output value and the second output value; and outputting the explanatory data for the first predictor based on the difference.

14. The system of claim 13, wherein the operation of generating the explanatory data for the second predictor having the second input value comprises:

computing a third output value for the risk assessment by applying the tree-based machine-learning model to the first predictor having the first input value and the second predictor having the second optimizing value;

computing an additional difference between the first output value and the second output value; and excluding, based on the difference being larger than the additional difference, an explanation of the second predictor from the explanatory data.

15. A non-transitory computer-readable medium having program code stored thereon, wherein the program code is executable by processing hardware to cause the processing hardware to perform operations comprising:
generating a tree-based machine-learning model that is a memory structure comprising interconnected parent nodes and terminal nodes, wherein each parent node includes a respective splitting variable that causes the parent node to be connected via links to a respective pair of child nodes, wherein the terminal nodes includes respective representative response values based on values of the splitting variables, wherein generating the tree-based machine-learning model comprises:
determining a splitting rule for partitioning data samples in a decision tree;
partitioning, based on the splitting rule, data samples into a first tree region and a second tree region;
computing a first representative response value from the data samples in first tree region and a second representative response value from the data samples in second tree region, wherein a monotonicity constraint for the decision tree is violated by a set of representative response values including the first and second representative response values, a representative response value for a closest lower neighboring region of the first tree region, and a representative response value for a closest upper neighboring region of the second tree region;
applying a modification to the decision tree by modifying the splitting rule and the set of representative response values to enforce the monotonicity constraint;
computing, with the decision tree having the modification, a first modified representative response value from data samples partitioned into the first tree region and a second modified representative response value from data samples partitioned into the second tree region, wherein:
the monotonicity constraint is satisfied by a modified set of representative response values, and
the modified set of representative response values includes the first and second modified representative response values, the representative response value for the closest lower neighboring region of the first tree region, and the representative response value for the closest upper neighboring region of the second tree region; and
outputting the decision tree having the modification; and
computing, based on the decision tree as outputted, explanatory data indicating relationships between (i) changes in a response variable computed with the tree-based machine-learning model and (ii) changes in one or more independent variables represented by the tree-based machine-learning model, wherein the independent variables comprise a first independent variable and a second independent variable, and wherein generating the explanatory data for the first independent variable having an input value comprises:
identifying a first optimizing value of the first independent variable and a second optimizing value of the second independent variable that cause the tree-based machine-learning model to output an optimal value for the response variable;
computing an additional value for the response variable by applying the tree-based machine-learning model to the first independent variable having the input value and the second independent variable having the second optimizing value;
computing a difference between the optimal value for the response variable and the additional value for the response variable; and
outputting the explanatory data for the first independent variable based on the difference.

16. The non-transitory computer-readable medium of claim 15, the operations further comprising computing, based on the decision tree as outputted, explanatory data indicating relationships between (i) changes in a response variable computed with the tree-based machine-learning model and (ii) changes in one or more independent variables represented by the tree-based machine-learning model,
wherein the independent variables comprise a first independent variable and a second independent variable,
wherein generating the explanatory data for the first independent variable having an input value comprises:
identifying a first optimizing value of the first independent variable and a second optimizing value of the second independent variable that cause the tree-based machine-learning model to output an optimal value for the response variable;
computing an additional value for the response variable by applying the tree-based machine-learning model to the first independent variable having the input value and the second independent variable having the second optimizing value;
computing a difference between the optimal value for the response variable and the additional value for the response variable; and
outputting the explanatory data for the first independent variable based on the difference.

17. The non-transitory computer-readable medium of claim 15, the operations further comprising computing, based on the decision tree as outputted, explanatory data indicating relationships between (i) changes in a response variable computed with the tree-based machine-learning model and (ii) changes in one or more independent variables represented by the tree-based machine-learning model,
wherein the independent variables comprise a first independent variable having a first input value and a second independent variable having a second input value,
wherein generating the explanatory data for the first independent variable having the first input value comprises:
identifying a first optimizing value of the first independent variable and a second optimizing value of the second independent variable that cause the tree-based machine-learning model to output an optimal value for the response variable;
computing a first output value for the response variable by applying the tree-based machine-learning model to the first independent variable having the first optimizing value and the second independent variable having the second input value;
identifying a second output value for the response variable that is computed by applying the tree-based machine-learning model to the first independent variable having the first input value and the second independent variable having the second input value;
computing a difference between the first output value and the second output value; and
outputting the explanatory data for the first independent variable based on the difference.

* * * * *